(12) United States Patent
Friedlander et al.

(10) Patent No.: US 8,712,955 B2
(45) Date of Patent: *Apr. 29, 2014

(54) OPTIMIZING FEDERATED AND ETL'D DATABASES WITH CONSIDERATIONS OF SPECIALIZED DATA STRUCTURES WITHIN AN ENVIRONMENT HAVING MULTIDIMENSIONAL CONSTRAINT

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/829,886

(22) Filed: Jul. 2, 2010

(65) Prior Publication Data
US 2010/0268684 A1 Oct. 21, 2010

Related U.S. Application Data

(63) Continuation of application No. 11/968,233, filed on Jan. 2, 2008, now Pat. No. 7,779,051.

(51) Int. Cl.
*G06F 17/30* (2006.01)
(52) U.S. Cl.
USPC ............ 707/602; 707/601; 707/603; 707/604
(58) Field of Classification Search
USPC ......... 707/601, 602, 603, 604, 686, 713, 803, 707/809, 812
See application file for complete search history.

(56) References Cited

U.S. PATENT DOCUMENTS

| | | | |
|---|---|---|---|
| 4,328,978 A | 5/1982 | McLaughlin |
| 4,551,842 A | 11/1985 | Segarra |
| 4,841,526 A | 6/1989 | Wilson et al. |
| 4,890,227 A | 12/1989 | Watanabe et al. |
| 5,070,453 A | 12/1991 | Duffany |
| 5,128,871 A | 7/1992 | Schmitz |
| 5,237,429 A | 8/1993 | Zuiss et al. |
| 5,406,626 A | 4/1995 | Ryan |

(Continued)

FOREIGN PATENT DOCUMENTS

| | | |
|---|---|---|
| EP | 0772367 | 5/1997 |
| EP | 0959635 | 11/1999 |

(Continued)

OTHER PUBLICATIONS

"Lab4" web page archived on Jul. 11, 2004 at: http://web.archive.org/web/20040711205854/http://www-users.cs.umn.edy/~mckoskey/CSCI5708_databases/original /lab4.html.

(Continued)

*Primary Examiner* — Mohammad S Rostami
(74) *Attorney, Agent, or Firm* — Yee & Associates, P.C.

(57) ABSTRACT

A method for creating a data warehousing scheme having optimally selected components. A mathematical model of a goal for the data warehousing scheme is input into an optimization engine. At least one constraint on the data warehousing scheme is input into the optimization engine. A mathematical optimization algorithm is performed using the optimization engine, wherein an output of the optimization engine is an optimized data warehousing scheme having optimally selected components. The optimized data warehousing scheme can be stored.

20 Claims, 20 Drawing Sheets

(56) References Cited

U.S. PATENT DOCUMENTS

| | | |
|---|---|---|
| 5,455,868 A | 10/1995 | Sergent et al. |
| 5,491,838 A | 2/1996 | Takahisa |
| 5,524,051 A | 6/1996 | Ryan |
| 5,550,021 A | 8/1996 | Blum et al. |
| 5,577,266 A | 11/1996 | Takahisa et al. |
| 5,590,195 A | 12/1996 | Ryan |
| 5,613,194 A | 3/1997 | Olds et al. |
| 5,642,397 A | 6/1997 | Agbaje-Anozie |
| 5,659,596 A | 8/1997 | Dunn |
| 5,692,446 A | 12/1997 | Becker et al. |
| 5,692,501 A | 12/1997 | Minturn |
| 5,745,532 A | 4/1998 | Campana, Jr. |
| 5,751,806 A | 5/1998 | Ryan |
| 5,764,740 A | 6/1998 | Holender |
| 5,781,704 A | 7/1998 | Rossmo |
| 5,809,472 A | 9/1998 | Morrison |
| 5,815,971 A | 10/1998 | Rothe et al. |
| 5,825,755 A | 10/1998 | Thompson et al. |
| 5,838,918 A | 11/1998 | Prager et al. |
| 5,880,598 A | 3/1999 | Duong |
| 5,889,474 A | 3/1999 | LaDue |
| 5,926,624 A | 7/1999 | Katz et al. |
| 5,930,350 A | 7/1999 | Johnson |
| 5,965,352 A | 10/1999 | Stoughton et al. |
| 5,974,312 A | 10/1999 | Hayes, Jr. et al. |
| 5,982,281 A | 11/1999 | Layson, Jr. |
| 6,021,403 A | 2/2000 | Horvitz et al. |
| 6,058,391 A | 5/2000 | Gardner |
| 6,076,166 A | 6/2000 | Moshfeghi et al. |
| 6,167,405 A | 12/2000 | Rosensteel, Jr. et al. |
| 6,189,004 B1 | 2/2001 | Rassen et al. |
| 6,192,340 B1 | 2/2001 | Abecassis |
| 6,212,524 B1 | 4/2001 | Weissman et al. |
| 6,216,134 B1 | 4/2001 | Heckerman et al. |
| 6,269,365 B1 | 7/2001 | Kiyoki et al. |
| 6,278,999 B1 | 8/2001 | Knapp |
| 6,285,886 B1 | 9/2001 | Kamel et al. |
| 6,321,207 B1 | 11/2001 | Ye |
| 6,353,818 B1 | 3/2002 | Carino, Jr. |
| 6,370,931 B2 | 4/2002 | Bennett |
| 6,377,993 B1 | 4/2002 | Brandt et al. |
| 6,385,604 B1 | 5/2002 | Bakalash et al. |
| 6,484,155 B1 | 11/2002 | Kiss et al. |
| 6,506,384 B1 | 1/2003 | Laal et al. |
| 6,509,898 B2 | 1/2003 | Chi et al. |
| 6,563,804 B1 | 5/2003 | Iyer et al. |
| 6,578,043 B2 | 6/2003 | Nye |
| 6,581,037 B1 | 6/2003 | Pak |
| 6,606,625 B1 | 8/2003 | Muslea et al. |
| 6,629,106 B1 | 9/2003 | Narayanaswamy et al. |
| 6,662,141 B2 | 12/2003 | Kaub |
| 6,675,159 B1 | 1/2004 | Lin et al. |
| 6,714,979 B1 | 3/2004 | Brandt et al. |
| 6,823,818 B2 | 11/2004 | van den Berg et al. |
| 6,826,568 B2 | 11/2004 | Bernstein et al. |
| 6,829,604 B1 | 12/2004 | Tifft |
| 6,905,816 B2 | 6/2005 | Jacobs et al. |
| 6,937,147 B2 | 8/2005 | Dilbeck et al. |
| 6,941,311 B2 | 9/2005 | Shah et al. |
| 6,954,736 B2 | 10/2005 | Menninger et al. |
| 6,963,826 B2 | 11/2005 | Hanaman et al. |
| 6,965,816 B2 | 11/2005 | Walker |
| 6,972,687 B1 | 12/2005 | Marshall et al. |
| 6,978,268 B2 | 12/2005 | Thomas et al. |
| 6,996,567 B2 | 2/2006 | Ghukasyan |
| 7,019,740 B2 | 3/2006 | Georgalas |
| 7,047,253 B1 | 5/2006 | Murthy et al. |
| 7,072,794 B2 | 7/2006 | Wittkowski |
| 7,080,081 B2 | 7/2006 | Agarwal et al. |
| 7,089,250 B2 | 8/2006 | Doganata et al. |
| 7,111,010 B2 | 9/2006 | Chen |
| 7,113,993 B1 * | 9/2006 | Cappiello et al. ............ 709/227 |
| 7,152,070 B1 | 12/2006 | Musick et al. |
| 7,179,645 B2 | 2/2007 | Humphreys et al. |
| 7,181,428 B2 | 2/2007 | Lawrence |
| 7,191,183 B1 | 3/2007 | Goldstein |
| 7,213,009 B2 | 5/2007 | Pestotnik et al. |
| 7,230,930 B2 | 6/2007 | Ahya et al. |
| 7,240,330 B2 | 7/2007 | Fairweather |
| 7,295,925 B2 | 11/2007 | Breed et al. |
| 7,337,146 B2 | 2/2008 | Heelan et al. |
| 7,346,492 B2 | 3/2008 | Shaw |
| 7,433,853 B2 | 10/2008 | Brockway et al. |
| 7,457,731 B2 | 11/2008 | Rao |
| 7,457,810 B2 | 11/2008 | Breining et al. |
| 7,403,922 B1 | 12/2008 | Friedlander et al. |
| 7,500,150 B2 | 3/2009 | Sharma et al. |
| 7,516,142 B2 | 4/2009 | Friedlander et al. |
| 7,523,118 B2 | 4/2009 | Friedlander et al. |
| 7,526,467 B2 | 4/2009 | Fogel |
| 7,533,113 B1 | 5/2009 | Haddad |
| 7,630,948 B2 | 5/2009 | Haddad |
| 7,543,149 B2 | 6/2009 | Ricciardi et al. |
| 7,580,922 B2 | 8/2009 | Friedlander et al. |
| 7,630,330 B2 | 8/2009 | Friedlander et al. |
| 7,584,160 B2 | 9/2009 | Friedlander et al. |
| 7,606,772 B2 * | 10/2009 | Flinn et al. ...................... 706/12 |
| 7,631,222 B2 | 12/2009 | Hasan et al. |
| 7,644,056 B2 | 1/2010 | Khalsa |
| 7,647,286 B2 | 1/2010 | Friedlander et al. |
| 7,647,288 B2 | 1/2010 | Friedlander et al. |
| 7,653,609 B2 | 1/2010 | Friedlander et al. |
| 7,676,390 B2 | 3/2010 | Senturk et al. |
| 7,685,083 B2 | 3/2010 | Fairweather |
| 7,693,766 B2 | 4/2010 | Horowitz |
| 7,698,246 B2 | 4/2010 | Friedlander et al. |
| 7,702,605 B2 | 4/2010 | Friedlander et al. |
| 2001/0051881 A1 | 12/2001 | Filler |
| 2002/0004782 A1 | 1/2002 | Cincotta |
| 2002/0049772 A1 | 4/2002 | Rienhoff, Jr. et al. |
| 2002/0052756 A1 | 5/2002 | Lomangino |
| 2002/0099691 A1 | 7/2002 | Lore et al. |
| 2002/0107824 A1 | 8/2002 | Ahmed |
| 2002/0111922 A1 | 8/2002 | Young et al. |
| 2002/0116389 A1 * | 8/2002 | Chen et al. ................ 707/103 R |
| 2002/0156791 A1 | 10/2002 | Nesamoney et al. |
| 2002/0184401 A1 | 12/2002 | Kadel, Jr. et al. |
| 2003/0014400 A1 | 1/2003 | Siegel |
| 2003/0033263 A1 | 2/2003 | Cleary |
| 2003/0074222 A1 | 4/2003 | Rosow et al. |
| 2003/0088438 A1 | 5/2003 | Maughan et al. |
| 2003/0126148 A1 | 7/2003 | Gropper et al. |
| 2003/0140063 A1 | 7/2003 | Pizzorno et al. |
| 2003/0171876 A1 | 9/2003 | Markowitz et al. |
| 2003/0191699 A1 | 10/2003 | Deveault et al. |
| 2003/0236822 A1 * | 12/2003 | Graupner et al. ............. 709/203 |
| 2004/0006532 A1 | 1/2004 | Lawrence et al. |
| 2004/0024675 A1 * | 2/2004 | Lahre et al. ..................... 705/36 |
| 2004/0054144 A1 | 3/2004 | Itai |
| 2004/0122787 A1 | 6/2004 | Avinash et al. |
| 2004/0193572 A1 | 9/2004 | Leary |
| 2004/0215626 A1 * | 10/2004 | Colossi et al. ................ 707/100 |
| 2004/0249678 A1 | 12/2004 | Henderson |
| 2004/0249679 A1 | 12/2004 | Henderson et al. |
| 2005/0004823 A1 | 1/2005 | Hnatio |
| 2005/0038608 A1 | 2/2005 | Chandra et al. |
| 2005/0049988 A1 | 3/2005 | Dahlquist et al. |
| 2005/0050068 A1 | 3/2005 | Vaschillo et al. |
| 2005/0102210 A1 | 5/2005 | Song et al. |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0246189 A1 | 11/2005 | Monitzer et al. |
| 2006/0069514 A1 | 3/2006 | Chow et al. |
| 2006/0184483 A1 | 8/2006 | Clark et al. |
| 2006/0218010 A1 | 9/2006 | Michon et al. |
| 2006/0282222 A1 | 12/2006 | Mitsuyama et al. |
| 2006/0287890 A1 | 12/2006 | Stead et al. |
| 2007/0011134 A1 * | 1/2007 | Langseth et al. ................... 707/1 |
| 2007/0027674 A1 | 2/2007 | Parson et al. |
| 2007/0061274 A1 * | 3/2007 | Gipps et al. ..................... 705/400 |
| 2007/0061287 A1 * | 3/2007 | Le et al. ............................ 707/2 |
| 2007/0073654 A1 | 3/2007 | Chow et al. |
| 2007/0106478 A1 | 5/2007 | Jung et al. |

(56) References Cited

U.S. PATENT DOCUMENTS

| | | |
|---|---|---|
| 2007/0174090 A1 | 7/2007 | Friedlander et al. |
| 2007/0174091 A1 | 7/2007 | Friedlander et al. |
| 2007/0185586 A1 | 8/2007 | Al-Attar et al. |
| 2007/0185737 A1 | 8/2007 | Friedlander et al. |
| 2007/0203872 A1 | 8/2007 | Flinn et al. |
| 2007/0233631 A1 | 10/2007 | Kobayashi et al. |
| 2007/0244701 A1 | 10/2007 | Erlanger et al. |
| 2007/0274337 A1 | 11/2007 | Purpura |
| 2007/0299691 A1 | 12/2007 | Friedlander et al. |
| 2008/0015871 A1 | 1/2008 | Eder |
| 2008/0027970 A1* | 1/2008 | Zhuge et al. ............... 707/102 |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0114724 A1* | 5/2008 | Indeck et al. ............... 707/2 |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |
| 2008/0228747 A1 | 9/2008 | Thrall et al. |
| 2008/0270398 A1* | 10/2008 | Landau et al. ............... 707/6 |
| 2008/0294459 A1 | 11/2008 | Angell et al. |
| 2008/0294692 A1 | 11/2008 | Angell et al. |
| 2009/0024553 A1 | 1/2009 | Angell et al. |
| 2009/0106179 A1 | 4/2009 | Friedlander et al. |
| 2009/0287503 A1 | 11/2009 | Angell et al. |
| 2009/0299766 A1 | 12/2009 | Friedlander et al. |

FOREIGN PATENT DOCUMENTS

| | | |
|---|---|---|
| JP | 8316872 | 11/1996 |
| JP | 2002312373 | 4/2001 |
| JP | 2002342484 | 11/2002 |
| WO | WO 9419571 | 9/1994 |
| WO | WO 9726718 | 7/1997 |
| WO | WO 0108077 | 2/2001 |

OTHER PUBLICATIONS

Adam et al., "Positive Patient Identification: a Practical Solution to a Challenging Problem", Toward an Electronic Patient '97. Conference and Exposition. Proceedings, Pt. vol. 3, 1997, Abstract Only.

Ahmad et al., An artificial neural network model for generating hydrograph from hydro-meteorological parameters, Department of Civil, Architectural and Environmental Engineering, University of Miami, Mar. 31, 2005.

"AHRQ Quality Indicators—Patient Safety Indicators—Technical Specifications", Department of Health and Human Services Agency for Healthcare Research and Quality, Version 3.1, Mar. 12, 2007, pp. 1-107. <http://www.qualityindicators.ahrq.gov>.

Altmann et al., "Cooperative Software Development: Concepts, Model and Tools", C Doppler Laboratory for Software Engineering, Johannes Kepler University, Linz, 1999, pp. 194-207.

Beaglehole, R, Men Ageing and Health: Achieving health across the life span, 2nd World Congress on the Ageing Male, World Health Organization, Feb. 2000, pp. 1-63.

Coa et al., "Research on Resource Scheduling for Development Process of Complicated Product", The 9th International Conference on Computer Supported Cooperative Work in Design Proceedings, vol. 1, May 24-26, 2005, pp. 229-331.

Chatfield, "Marketing an HMO by 'Smart' ID Cards with Patient History on an Electronic Medical Record", Proceedings. Toward an Electronic Patient Record '96. Twelfth International Symposium on the Creation of Electronic Health Record System and Global Conference on Patient Cards, Pt. vol. 1, 1996.

Chen et al., "Research on Organization Method of Development Activities for Complicated Product", The 9th International Conference on Computer Supported Cooperative Work in Design Proceedings, vol. 1, May 24-26, 2005, pp. 234-239.

Gabrieli, "Guide for Unique Healthcare Identifier Model", Journal of Clinical Computing, vol. 21, No. 5, 1993, Abstract Only.

Goehring, "Identification of Patients in Medical Databases—Soundex Codes Versus Match Code", Medical Informatics, vol. 10, No. 1, pp. 27-34, Jan.-Mar. 1985, Abstract Only.

Goodwin et al., "Data Mining for Preterm Birth Prediction", pp. 46-51.

Grimson et al., "The SI Challenge in Health Care", Communications of the ACM, vol. 43, No. 6, Jun. 2000, pp. 49-55.

Grzymala-Busse, "Knowledge Acquisition Under Uncertainty—a Rough Set Approach", in: Journal of Intelligent and Robotic Systems (1988). Available at Springer.

Han and Fu, "Discovery of Multiple-Level Association Rules from Large Databases," in: Proceedings of the 21st VLDB Conference (1995). http://citeseerx.ist.psu.edu/viewdoc/download?doi=10.1.1.64.3214&rep1&type=pdf.

Hashemi et al., "Development of Group's Signature for Evaluation of Skin Cancer in Mice Cause by Ultraviolet Radiation", Proceedings of the International Conference of Information Technology: Computers and Communications, ITCC 2003, IEEE Computer Society, Washington, DC, USA, Apr. 28-30, 2003, pp. 1-4.

Hayes et al., "Picking up the Pieces: Utilizing Disaster Recovery Project Management to Improve Readiness and Response Time", IEEE Industry Application Magazine, Nov./Dec. 2002, pp. 1-10.

Hoshiai et al., "SION Architecture: Semantic Information-Oriented Network Architecture", Transactions of the Institute of Electronics, Information and Communication Engineers, vol. J84-B, No. 3, pp. 411-424, Mar. 2001, Abstract Only.

Hsinchun, Machine Learning for Information Retrieval: Neural Networks, Symbolic Learning, and Genetic Algorithms, Journal of the American Society for Information Science, Apr. 1995.

Johansson et al., "Visual Analysis Based on Algorithmic Classification", Proceedings of the Seventh International Conference on Information Visualization, London, England, Jul. 16-18, 2003, pp. 1-4.

Kiang, "Extending the Kohonen Self-Organizing Map Networks for Clustering Analysis", Journal, Computational Statistics & Data Analysis, vol. 38, Dec. 2, 2001, pp. 161-180.

Laura et al., "IBM Federated Database Technology", Mar. 1, 2002. http://www.ibm.com/developerworks/data/library/techarticle/0203haas/0203haas.html.

Lowery et al., "Barriers to Implementing Simulation in Health Care", Proceedings from the 1994 Winter Simulation Conference, pp. 868-875.

Luckham et al., "Event Processing Glossary", May 2008, Retrieved Jun. 9, 23008, pp. 1-13. http://complexevents.com/?p=361.

Lurie, "The Federation Database Interoperability," Apr. 24, 2003. http://www.ibm.com/developerworks/data/library/techarticle/0304lurie/0304lurie.html.

McShan et al., "PathMiner: predicting metabolic pathways by heuristic search", School of Medicine, University of Colorado, 2003.

Polak et al., "Using Automated Analysis of the Resting Twelve-Lead ECG to Identify Patients at Risk of Developing Transient Myocardial Ischaemia—an Application of an Adaptive Logic Network", Physiological Measurement, vol. 18, No. 4, Nov. 1997, Abstract Only.

Schadow et al., "Discussion Paper: Privacy-Preserving Distributed Queries for a Clinical Case Research Network," in: IEE Int'l Conference on Data Mining Workshop on Privacy, Security, and Data Mining (2002). Available at: ACM.

Shelfer et al., "Smart Card Evolution", Communications of the ACM, vol. 45, No. 7, Jul. 2002, pp. 83-88, Abstract Only.

Silver et al., "An Overview of Heuristic Solution Methods", The Journal of the Operational Research Society, vol. 55, No. 9, Sep. 2004, pp. 936-956.

Souder, "Analytical Effectiveness of Mathematical Models for R&D Project Selection", Management Science, Application Series, vol. 19, No. 8, Apr. 1973, pp. 907-923.

Wang, "A COBRA-based Object Framework with Patient Identification Translation and Dynamic Linking. Methods for Exchanging Patient Data", Methods of Information in Medicine, vol. 38, No. 1, Mar. 1999, Abstract Only.

(56) References Cited

OTHER PUBLICATIONS

Wang et al., "A Mathematical Approach to Disaster Recovery Planning", Xidian University, National Info Security Engineering and Technology Research Center, Beijing, China, Proceedings of the First International Conference of Semantics, Knowledge, and Grid, SKG, pp. 1-3.

Wong et al., "Rule-Based Anomaly Pattern Detection for Detecting Disease Outbreaks," in: AAAI-02 Proceedings (2002) https://www.Aaai.org/Papers/AAAI/2002/AAAI02-034.pdf.

* cited by examiner

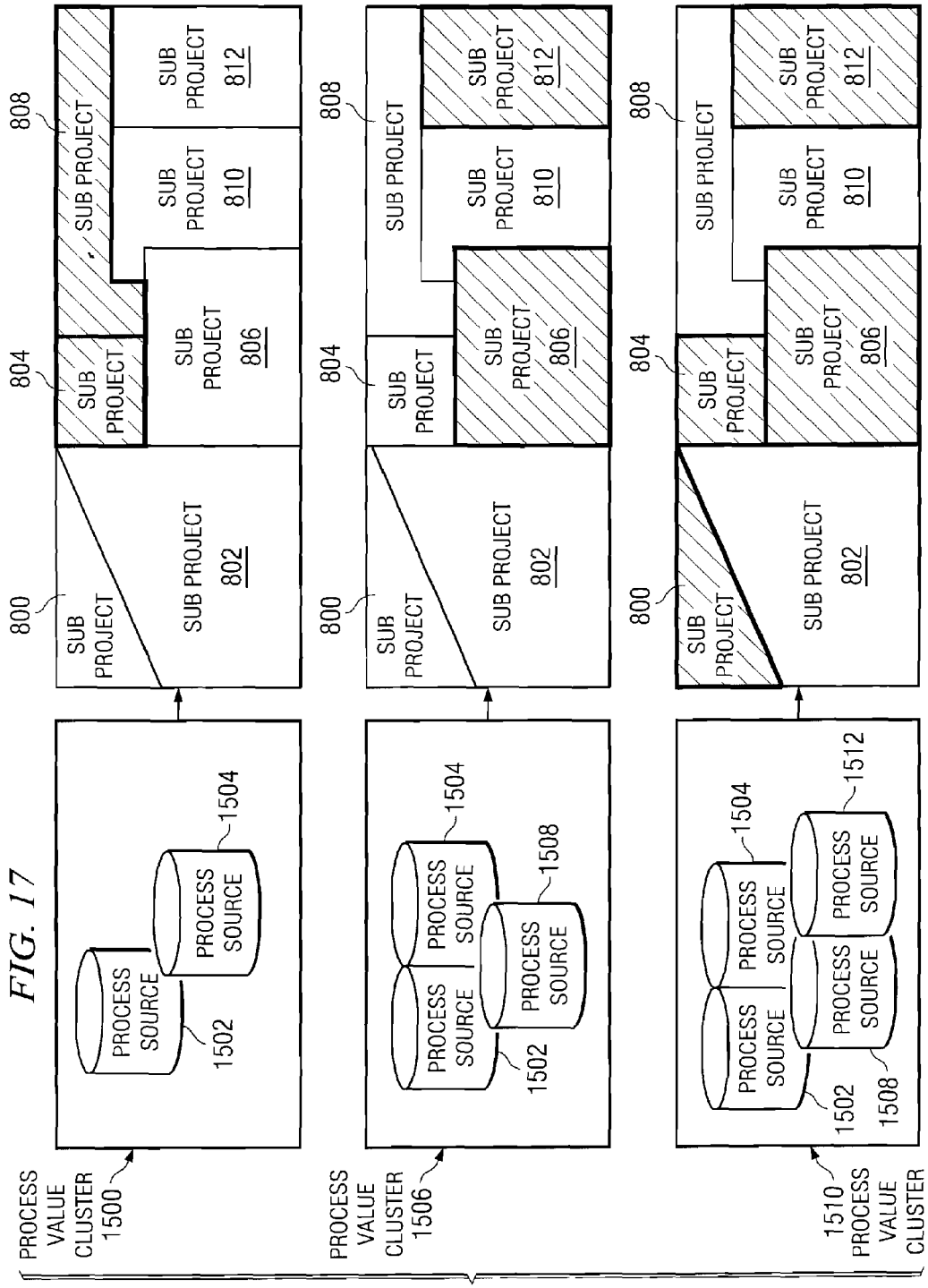

AFFINITY MATRIX 1800

| | | 1806 DATA SOURCE | 1808 DATA SOURCE | 1810 DATA SOURCE | 1812 DATA SOURCE | 1814 DATA SOURCE |
|---|---|---|---|---|---|---|
| 1202 | REPORT DATA STRUCTURE | 0 | 0 | 0 | 0 | 1 |
| 1204 | SCREEN DATA STRUCTURE | 0 | 0 | 0 | 1 | 0 |
| 1206 | PRODUCTION SCHEDULE DATA STRUCTURE | 1 | 1 | 1 | 0 | 0 |
| 1208 | DELIVERABLE DATA STRUCTURE | 0 | 1 | 0 | 1 | 1 |
| 1302 | APPLICATION DATA STRUCTURE | 1 | 0 | 1 | 0 | 0 |
| 1304 | APPLICATION DATA STRUCTURE | 0 | 0 | 0 | 1 | 1 |
| 1306 | FLOW DATA STRUCTURE | 1 | 1 | 0 | 0 | 0 |
| 1308 | FLOW DATA STRUCTURE | 0 | 1 | 0 | 0 | 0 |
| 1818 | PERSONAL SKILLS PROGRAM DATA STRUCTURE | 0 | 1 | 0 | 0 | 0 |
| 1820 | OPPORTUNITIES DATABASE FOR SALES DATA STRUCTURE | 0 | 1 | 0 | 0 | 1 |

*FIG. 18*

| COST | ETL | FEDERATION | XML FROM REMOTE SOURCE | NATIVE XML IN DW | CONSTRAINTS |
|---|---|---|---|---|---|
| DESIGN | HIGH | MEDIUM | LOW | LOW | DATA MODELERS, DBA, ARCHITECTS |
| IMPLEMENTATION | HIGH | LOW | LOW | LOW | PROGRAMMERS, PM DBA |
| BATCH DATA MOVEMENT | LOW | ZERO | ZERO | LOW | ETL ARCHITECTS |
| BATCH DATA CONVERSION | LOW | ZERO | ZERO | LOW | ETL PROGRAMMERS |
| RUNTIME DATA MOVEMENT | ZERO | HIGH | VERY HIGH | ZERO | NETWORK LIMITS |
| RUNTIME DATA CONVERSION | ZERO | HIGH | VERY HIGH | HIGH | CPU OVERLOAD 1ST SHIFT ON LAST DAY OF MONTH |
| DW STORAGE INCREASES | MEDIUM | ZERO | ZERO | HIGH | BUDGET |
| CPU MEMORY | LOW | MEDIUM | VERY HIGH | VERY HIGH | CPU OVERLOAD 1ST SHIFT ON LAST DAY OF MONTH |
| CPU CYCLES | LOW | MEDIUM | VERY HIGH | VERY HIGH | CPU OVERLOAD 1ST SHIFT ON LAST DAY OF MONTH |
| QUERY RESPONSIVENESS | BEST | POOR | VERY POOR | POOR | USE CASE DEFINITIONS, SERVICE LEVEL AGREEMENT |
| | | | 1 | | SYSTEM OUTPUT IS ONLY AVAILABLE AS MARKUP LANGUAGE |
| | | 1 | | | DB ARE LEGALLY, POLITICALLY, OR DATA RECENCY RESTRICTED |
| | 1 | | | | LIMITED RUNTIME NETWORK CAPACITY |

FIG. 28

OPTIMIZING FEDERATED AND ETL'D DATABASES WITH CONSIDERATIONS OF SPECIALIZED DATA STRUCTURES WITHIN AN ENVIRONMENT HAVING MULTIDIMENSIONAL CONSTRAINT

This application is a continuation of application Ser. No. 11/968,233, filed Jan. 2, 2008, status allowed.

BACKGROUND OF THE INVENTION

1. Field of the Invention

The present invention relates generally to data processing and an improved data processing system. More specifically, the present invention relates optimized approaches to creating large information technology systems. Still more particularly, the present invention relates to optimized approaches for storing and processing data for a large project.

2. Description of the Related Art:

Large corporations or other large entities use information technology systems to manage their operations. An information technology system is a system of data processing systems, applications, data, reports, flows, algorithms, databases, and other infrastructure used to maintain the data and operations of the organization. A large scale information technology system is not necessarily located in one single physical location, but can be situated in many different physical sites implemented using numerous physical devices and software components. A large scale information technology system can be referred to as a major information technology system.

Major information technology system projects, such as those used by large corporations, often fail and some fail disastrously. Failure often costs millions of dollars, tens of millions of dollars, or even more in wasted time, manpower, and physical resources. Thus, substantial effort is usually exerted in planning the construction of a major information technology system. Planning construction of a major information technology system, at least in theory, reduces the chances of failure.

Major information technology systems projects are beyond the abilities of a single individual to implement alone. Likewise, construction of major information technology system projects can not be viewed as a single monolithic project due to the vastness and complexity of these system projects. Thus, major information technology system projects are often constructed in phases using groups of sub-projects. Various groups of people work to complete each sub-project. As work progresses, the sub-projects are assimilated together in order to create the major information technology system project.

However, even with planning and the use of sub-projects, most major information technology system projects fail or are never completed. Even if the major information technology system project is implemented, the resulting major information technology system project does not function optimally with respect to maximizing the efficiency of the organization for which the major information technology system project is constructed. For example, subsets of the whole major information technology system project may not match data, business requirements, and/or resources in an optional manner. As a result, the organization suffers from the inefficiencies of the final major information technology system project. Correcting or adjusting these inefficiencies may be cost prohibitive due to the fundamental nature of how the major information technology system project was constructed.

The most typical reason for failure or inefficiency of these system projects is that the construction of these system projects is approached from a non-data centric viewpoint. Instead, design of sub-projects of major information technology system projects often is performed by managers, executives, or others who are experts at understanding where a business should go or how a business should operate, but are not technically proficient at implementing or constructing a major information technology system project. As a result, the sub-projects "look good on paper" but, when implemented, fail or, if successful individually, can not be integrated together in a desired manner. An entire major information technology system project may fail or be inefficient if sub-projects that were designed to build the major information technology system projects can not be integrated. Currently available methods and system projects do not provide a means to reliably create efficient major information technology system projects. Therefore, it would be advantageous to have an improved method and apparatus for creating optimized sub-projects useful for creating and implementing a major information technology project.

Additionally, an extremely complex problem can arise regarding how to store data for large information technology system projects. For example, a particular enterprise may need to access many different types of data, and possibly vast amounts of data of each data type. For example, data can be warehoused on-site using a process known as "extract, transform, and load," often referred-to as "ETL" in the industry. Once available, ETL data is time efficient and easy to access, but requires possibly extremely large data storage facilities and complex database technology. In another example, data can be federated. Federated data is stored offsite, often in many different databases. Federated data is accessed via a network. Federated data requires less maintenance relative to data that has been ETL'd; however, federated data is often slow to access, relative to ETL'd data. Federated data also consumes vast amounts of networking resources and is dependent on target data schemas.

Complicating how data is stored, is determining in what form data is to be stored. For example, data can be stored in the form of pictures, simple text, in the form of specialized databases, in a form that is application-specific, in a mark-up language, or in many other different data types.

The determination of how data is stored and in what format data is stored can be extremely difficult and complex for large information technology system projects. Today, solutions are often sub-optimal, due to human limitations and due to possibly political decisions that impact how a project is put together. Thus, an improved method and apparatus is needed for optimally determining how data is stored together and in what format data is stored.

SUMMARY OF THE INVENTION

A computer-implemented method, computer program product, and data processing system are provided for creating optimized sub-projects for a project. Boundary conditions, input regarding output objects, and input regarding "as-is" data sources are received. The output objects are decomposed into data objects and the output objects are also decomposed into logical processes used to create the output objects. Value clusters are determined. The data objects are organized into "to be" data structures and the "to be" data structures are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

A computer-implemented method, computer program product, and data processing system are provided for creating a data warehousing scheme having optimally selected components. A mathematical model of a goal for the data warehousing scheme is input into an optimization engine. At least one constraint on the data warehousing scheme is input into the optimization engine. A mathematical optimization algorithm is performed using the optimization engine, wherein an output of the optimization engine is an optimized data warehousing scheme having optimally selected components. The optimized data warehousing scheme can be stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 17 is a block diagram illustrating elements of a "to be" process model, in accordance with an illustrative embodiment;

FIG. 18 is an exemplary affinity matrix, in accordance with an illustrative embodiment;

FIG. 28 is a table showing relative costs and constraints of various methods of warehousing and accessing data, in accordance with an illustrative embodiment;

DETAILED DESCRIPTION OF THE PREFERRED EMBODIMENT

Figure 1:
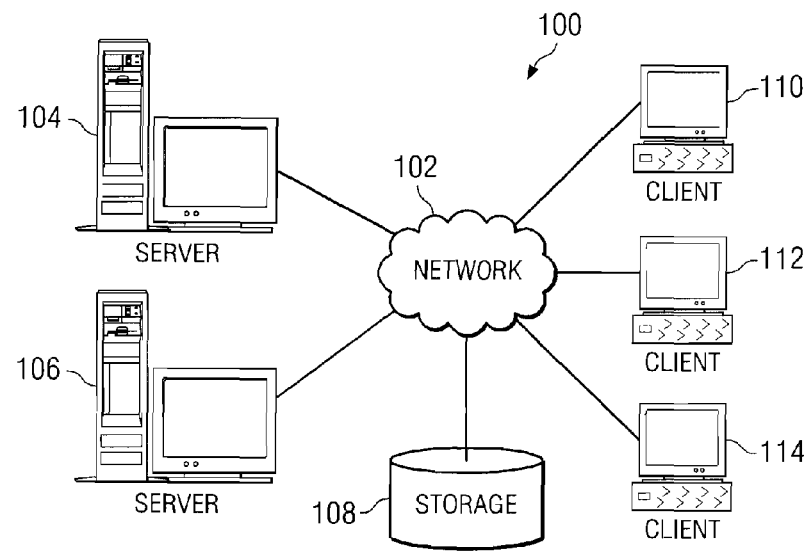
FIG. 1 is a pictorial representation of a network of data processing systems in which illustrative embodiments may be implemented.
Figure 2:
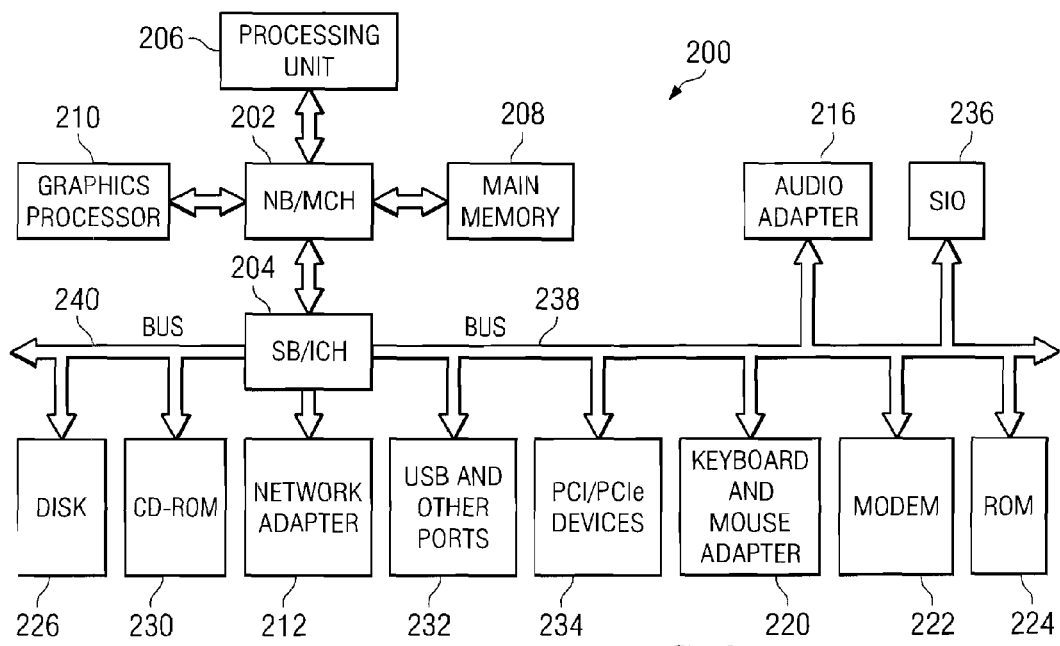
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

FIG. 2 is a block diagram of a data processing system in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc., in the United States, other countries, or both).

Instructions for the operating system, the object-oriented programming system, and applications or programs are located on storage devices, such as hard disk drive 226, main memory 208, tape drives, or any other form of memory or storage for data, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A computer-implemented method, computer program product, and data processing system are provided for creating an optimized major information technology project having optimally selected optimized sub-projects. An optimized sub-project is a set of data representing a portion of the project. For example, an optimized sub-project could be a set of data that describes how physical data processing systems should be setup relative to each other. Another example of an optimized sub-project could be a set of data that describes how business reports should be generated, what information should be included in the business reports, who should receive the business reports and the order in which the business reports should be generated. Many other examples of optimized sub-projects exist.

As part of an exemplary process, one or more data processing systems receive boundary conditions, input regarding output objects, and input regarding "as-is" data sources. An "as-is" data source is an existing data source. Boundary conditions include all data that places one or more boundaries on a project. Examples of boundary conditions include resource data and constraint data. Resource data reflects resources available for the project, such as money and manpower. Constraint data includes constraints imposed on the project, such as data reflecting deadlines, legal requirements, data availability, and others. A special type of constraint data is data regarding political concerns. Data reflecting political concerns includes data that reflects political realities, such as resource allocation among organizational departments, timing of deliverables, and work allocation.

Examples of input regarding output objects include data reflective of output objects. Output objects are those outputs or deliverables that the project is designed to deliver. Specific examples of output objects include screens showing particular information, pictures, or query results; interactive graphical user interfaces; reports; services delivered, including deliverables; applications; queries; applications, flows, and algorithms; combinations thereof, and others.

Data regarding "as-is" data sources is data reflective of available data sources. Examples of "as-is" data sources can include available databases, available files, available hardcopy paper files, and other data sources. An "as-is" data source is not a data source that is yet to be developed or that is yet to be placed into a desired form. An "as-is" data source is distinguished from a "to be" data source. A "to be" data source is a data source that is not yet in existence or is not yet in a desired form, but that has been modeled or can be modeled.

Once the boundary conditions, input regarding output objects, and input regarding "as-is" data sources are received, the output objects are decomposed into data objects. A data object is a data structure that contains data reflective of an output object. A data object can be an "object" as that term is used in object-oriented programming for computer languages such as C++ and Java.

The term "decompose," which also includes the concept of factoring in computer science, refers to the process by which a complex problem or system is broken down into parts that are easier to conceive, understand, program, and maintain. In structured programming, algorithmic decomposition breaks a process down into well-defined steps. In object-oriented programming, one breaks a large system down into progressively smaller classes or objects that are responsible for some part of the problem domain. An object, process, data, or flow can be "decomposed" in a mathematical, data-centric manner according to many known methods.

Additionally, the output objects are also decomposed into process data objects, which are data objects reflective of logical processes used to create the output objects. A logical process used to create an output object can be any application, flow, algorithm, or similar process for creating an output object. Such flows can also be characterized as "objects" as that term is used in object-oriented programming.

The illustrative examples also include determining value clusters. A value cluster is the discrete intersection of data and that data's ability to add value to an organization. A value cluster may also be considered a group of resources that, when taken together, support one or more output objects having a utility value to an organization. A value cluster may be considered one of a data value cluster and a process value cluster. A data value cluster includes one or more data sources that support one or more data objects. A process value cluster includes one or more logical processes that support one or more output objects.

Next, the data objects are organized into "to be" data structures to form a "to be" data model and the "to be" data structures are mapped to the "as-is" data sources. The phrase "to be", as used herein, describes something that is desired for the major information technology project that may, or may not, yet exist. The phrase "to be" also can be referred to as "future" or "future model." Thus, a "to be" data model is a model or other description of a future data model. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Continuing with the illustrative example, the "to be" data structures are mapped to the "as-is" data sources. An "as-is" data source is an existing source of data. The existing source of data may not be complete, may not be of sufficient quality, and may not be in a format desired for the completed project; nevertheless, the "as-is" data sources may be adequate for the completed project.

Next, additional processes are determined for moving data from a source to a target. For example, a process can be determined for summarizing raw patient data and turning that raw patient data into a report for a hospital executive or for a doctor. Additionally, transformation issues are incorporated into the processes, such as estimating the costs and risks of moving data from a source to a destination in the correct format.

The exemplary embodiment also includes creating an affinity matrix based on the value clusters. An affinity matrix is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

Optimization, as used herein, is the mathematical study of problems in which a minimum or a maximum for a function of a real variable is sought by systematically choosing the values of the real number or integer variables from within an allowed set. The problem can be mathematically represented as follows:

Given: A function f: A→R from some set A to the real numbers. Sought: An element $x_0$ in A such that $f(x_0) \leq f(x)$ for all x in A ("minimization") or such that $f(x_0) \geq f(x)$ for all x in A ("maximization").

Typically, A is some subset of the Euclidean space Rn, often specified by a set of constraints, equalities or inequalities that the members of A have to satisfy. The elements of A are called feasible solutions. The function f is called an objective function, or cost function. A feasible solution that minimizes or maximizes the objective function is called an optimal solution. The domain A of f is called the search space, while the elements of A are called candidate solutions or feasible solutions.

Generally, when the feasible region or the objective function of the problem does not present convexity, there may be several local minima and maxima, where a local minimum $x^*$ is defined as a point for which there exists some $\delta > 0$ so that for all x such that $$\|x - x^*\| \leq \delta;$$

the expression $$f(x^*) \leq f(x)$$

holds. In other words on some region around $x^*$ all of the function values are greater than or equal to the value at that point. Local maxima are defined similarly.

Commercial optimization engines are available and can be used with the illustrative examples described herein. Examples of commercial optimization engines include Optimization Subroutine Library and MPSX (Mathematical Programming System Extended), both available from International Business Machines Corporation, ILOG Cplex, and GLPK (Gnu Linear Programming Kit). Thus, as defined herein, the term "optimized sub-project" refers to a mathematically defined data structure that describes the structure of a sub-project and steps to be taken to implement a sub-project of a major project. Accordingly, described differently, the exemplary processes described herein provide a computer implemented method, apparatus, and computer usable program code for generating optimized sub-projects based on a weighted value of desired outputs mapped against source data, required transformations, boundaries, and an affinity matrix.

The project sought to be constructed using the illustrative embodiments described herein can be any large project. Examples of other large projects suitable for the planning techniques described herein include government agencies, outer-space programs, major military operations, and other major projects. However, the non-limiting embodiments described herein provide an illustrative example of creating a major information technology project.

Taken together, the group of optimized sub-projects can be assimilated into a plan an organization can follow to build the most efficient project plan possible. Because the plan is data-centric, an efficient major information technology project can be constructed even if the major information technology project is very large and complex.

Figure 7:
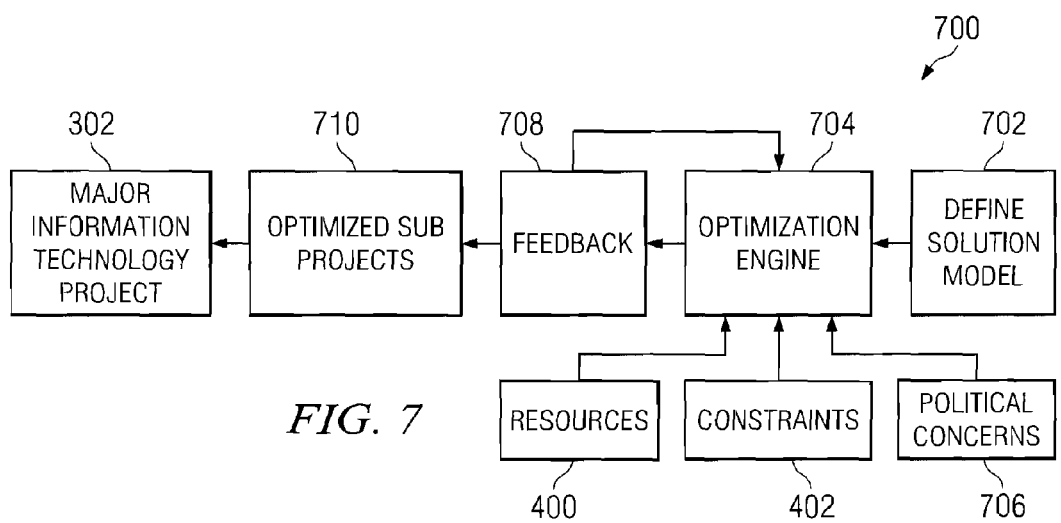
FIG. 7 is a block diagram illustrating a computer-implemented method of creating optimized sub-projects for a major information technology project, in accordance with an illustrative embodiment.
Figure 8:
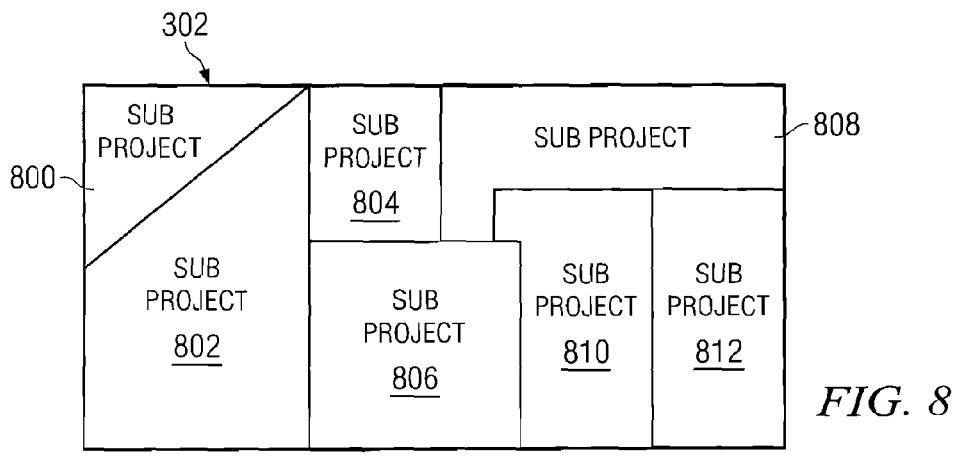
FIG. 8 is a block diagram illustrating optimally selected sub-projects for a major information technology project, in accordance with an illustrative embodiment.
Figure 9:
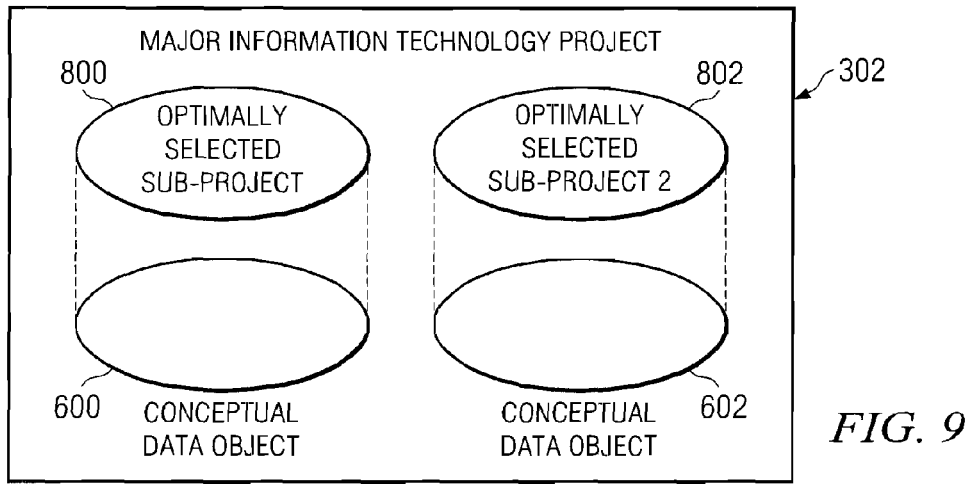
FIG. 9 is a block diagram illustrating major information technology sub-projects that efficiently overlap underlying realities of existing information technology systems, in accordance with an illustrative embodiment.
Figure 25:
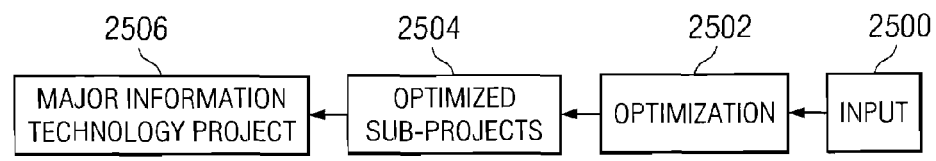
FIG. 25 is a block diagram illustrating a computer-implemented method of creating optimized sub-projects for a major information technology project, in accordance with an illustrative embodiment.
Figure 26:
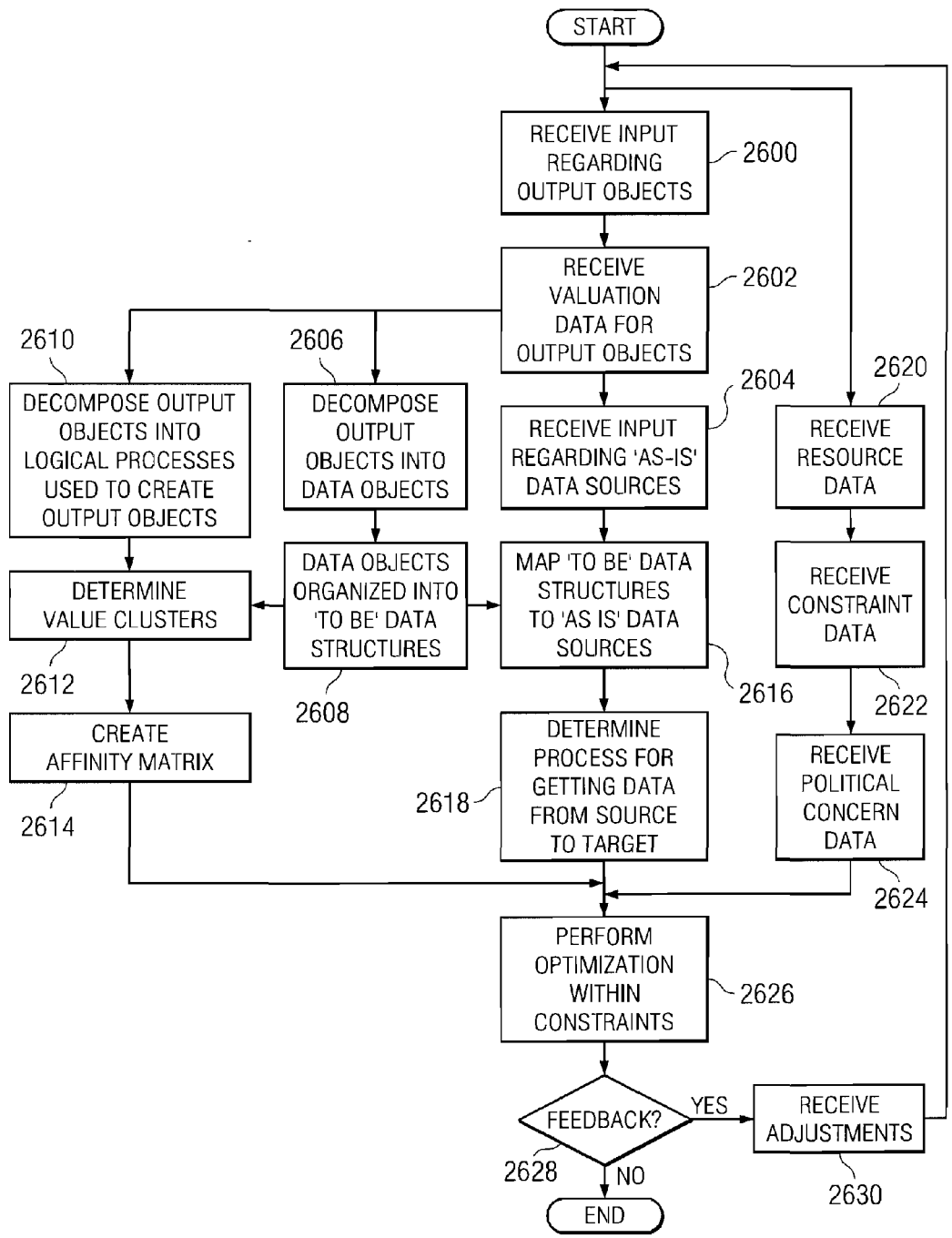
FIG. 26 is a flowchart illustrating a computer-implemented method of creating optimized sub-projects for a major information technology project, in accordance with an illustrative embodiment.

The following figures describe in detail the problem to be solved, the inadequacies of the prior art, and examples of the solution to the problem to be solved. FIG. 3 through FIG. 6 describe the problem to be solved and the inadequacies of the prior art. FIG. 7 through FIG. 9 illustrate a summary of an illustrative embodiment for solving the problem described in FIG. 3 through FIG. 6. FIG. 10 through FIG. 24 provide a detailed description of the devices and methods useful for implementing the illustrative embodiments described herein. FIG. 25 provides another overview of an illustrative embodiment for solving the problem of planning a project. FIG. 26 is a flowchart illustrating an illustrative embodiment of planning a major information technology project.

As specified above, FIG. 3 through FIG. 6 describe the problem to be solved and the inadequacies of the prior art. Common reference numerals used in different figures correspond to each other. Thus, for example, major information technology project 302 is the same in FIG. 3, FIG. 4, FIG. 5, and FIG. 6.

Figure 3:
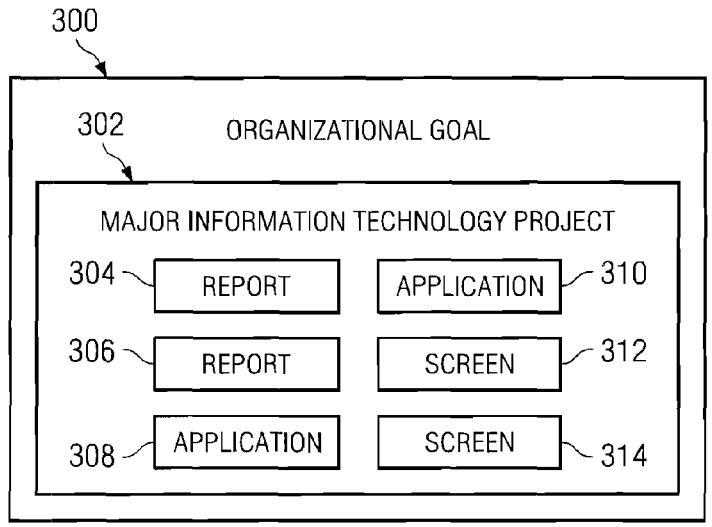
FIG. 3 is a block diagram illustrating a major information technology project, in accordance with an illustrative embodiment.

Referring now to the particular figures, FIG. 3 is a block diagram illustrating a major information technology project, in accordance with an illustrative embodiment. An organization has organizational goal 300 that the organization desires to implement. The goal may be to create a hospital system, a new government agency, a new major corporation, or any other goal. In the illustrative embodiments described herein, organizational goal 300 is a large scale goal similar to those described in the previous examples.

As part of organizational goal 300, major information technology project 302 is to be implemented to create a large scale information technology system project. An information technology system project is a system of data processing systems, applications, data, reports, flows, algorithms, databases, and other infrastructure used to maintain the data and operations of the organization. A large scale information technology system project is not necessarily located in one single physical location, but can be situated in many different physical sites implemented using numerous physical devices and software components. A large scale information technology system project can be referred to as a major information technology system project.

Major information technology project 302 has as goals one or more output objects. Output objects are those outputs or deliverables that the project is designed to deliver. Specific examples of output objects include report 304, report 306, application 308, application 310, screen 312, and screen 314.

A report is any type of output of a query or process. For example, a report could be a list of the number of patients having a particular set of properties. A report could also be a quarterly financial statement or any other type of report as that word is commonly known in business.

An application is any type of software application. An application can also be a script, flow, or other process that can be implemented in a computer.

A screen can be any graphical user output of an application. A screen can be a graphical user interface adapted to accept user input. For example, a screen could be a graphical user interface adapted to accept a query for a database, or a screen could be a graphical user interface adapted to accept data for entry into a database. A screen can also display a report.

Although major information technology project 302 is expressed as having output objects 304, 306, 308, 310, 312, and 314, many other types of output objects could also exist. For example, other types of output objects could be application, database, data cube, data structure, flat file of data, a graph, a directed graph, a project plan, an automated control system, a virtual reality visualization, a printed report, an on-screen representation of a printed report, a Web page, an email, an XML (Extended Markup Language) data structure, a document, a submission for an organization such as a government agency (like a FDA submission), an alert, a natural language representation of data, and a notification list. Other types of output objects exist.

Figure 4:
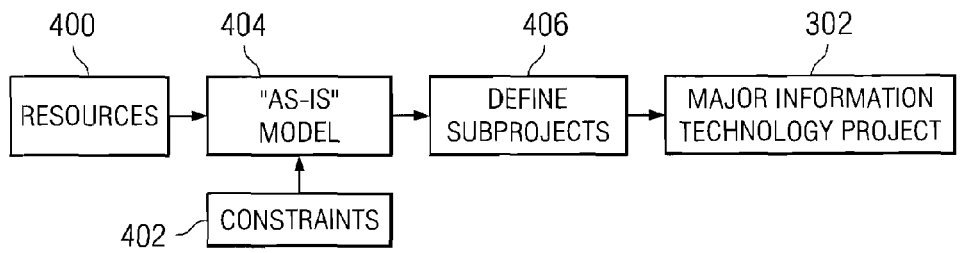
FIG. 4 is a block diagram of a prior art method of constructing a major information technology project.

FIG. 4 is a block diagram of a prior art method of constructing a major information technology project. The method shown in FIG. 4 can be implemented in one or more data processing systems, such as data processing systems 104, 106, 110, 112, and 114 in FIG. 1 and data processing system 200 shown in FIG. 2. The method shown in FIG. 4 can be implemented among multiple computers over a network, such as network 102 shown in FIG. 1.

Once an organization has specified organization goal 300 and the output objects desired for major information technology project 302 of FIG. 3, the organization then has to cause major information technology project 302 to be created. In the prior art, the process of implementing major information technology project 302 is performed in a "left to right" manner.

Figure 21:
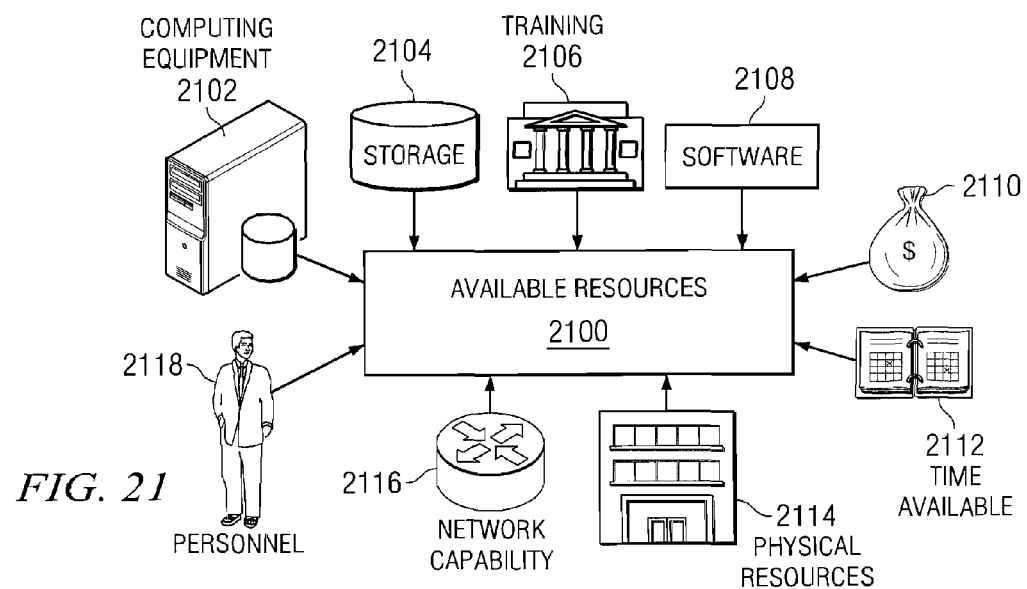
FIG. 21 is a block diagram illustrating exemplary available resources, in accordance with an illustrative embodiment.
Figure 22:
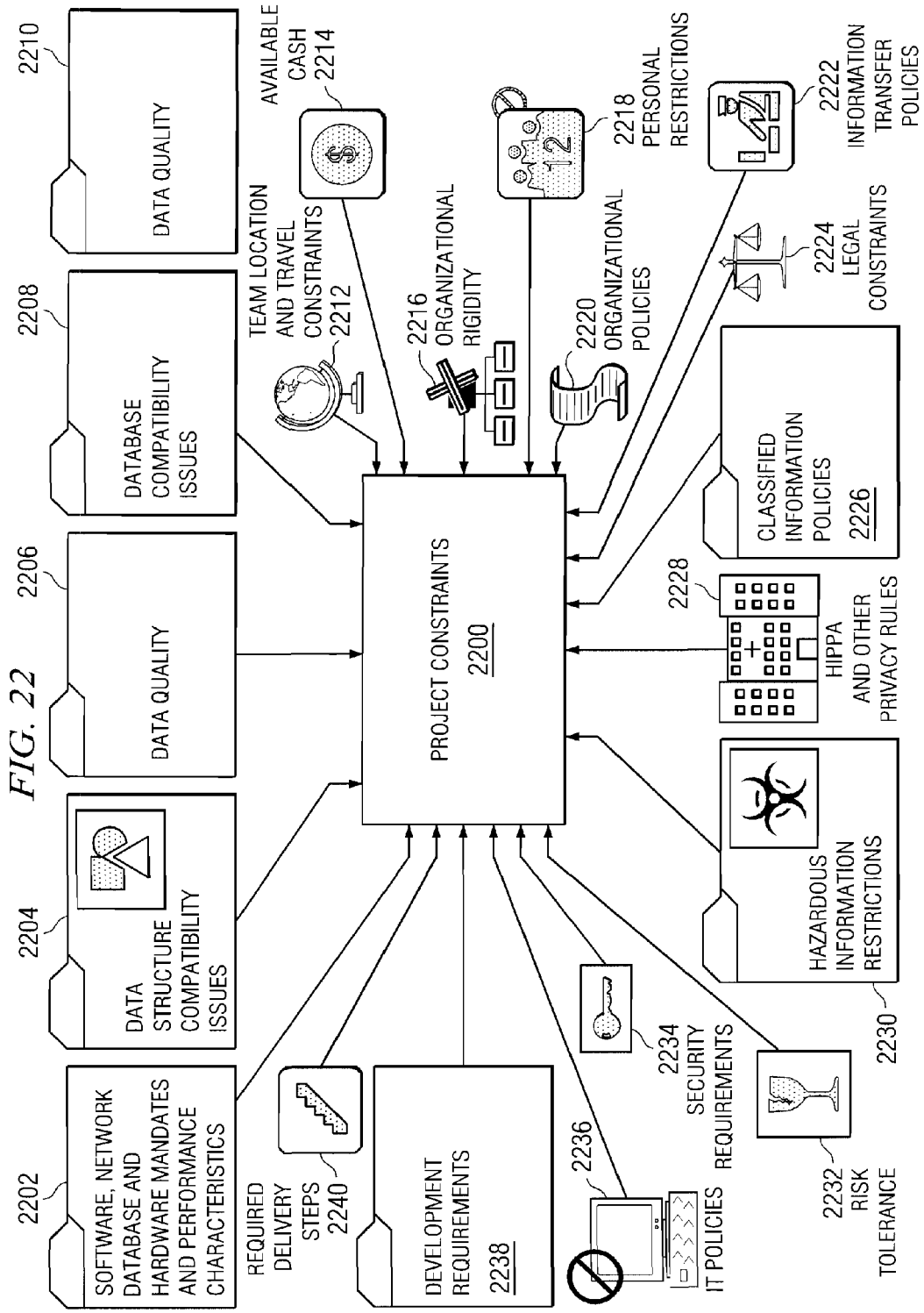
FIG. 22 is a block diagram illustrating exemplary project constraints, in accordance with an illustrative embodiment.

Specifically, one or more individuals identify all resources available 400 to the organization for major information technology project 302. Examples of resources are shown in FIG. 21, though can include items such as money, manpower, existing databases, existing software, and the like. Similarly, one or more individuals identify all constraints 402 imposed on the organization for major information technology project 302. Examples of constraints are shown in FIG. 22, though can include items such as legal constraints, security requirements, time constraints, and the like.

Resources 400 and constraints 400 are fed into "as-is" model 404. An "as-is" model describes all of the identified resources available to major information technology project 302 and all of the identified constraints imposed on major information technology project 302. Thus, an "as-is" model can be referred to as an existing model that describes existing resources. An "as-is" model can be reflected in a database or some other computer-readable format; however, often "as-is" model 404 is an ad-hoc report used by individuals to manually define subprojects 406. Thus, one or more individuals and/or one or more computer programs define subprojects 406. The sub-projects are then individually executed in a specified order, some of which are performed in parallel, to implement major information technology project 302.

Figure 5:
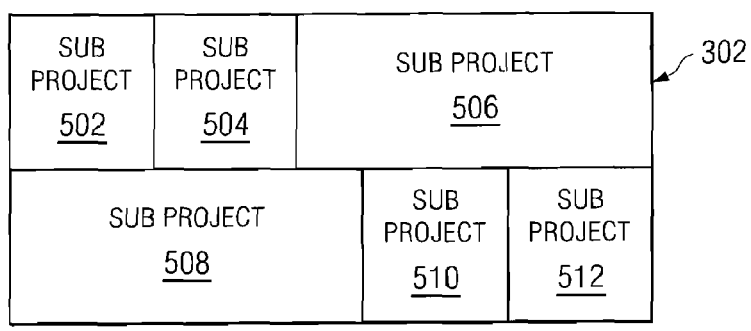
FIG. 5 is a block diagram of a set of sub-projects created using the prior art method shown in FIG. 4.

FIG. 5 is a block diagram of a set of sub-projects created using the prior art method shown in FIG. 4. As a result of performing the step of "define sub-projects 406" in FIG. 4, major information technology project 302 is divided up into sub-projects as shown. In the illustrative example of FIG. 5, major information technology project 302 includes six sub-projects; sub-project 502, sub-project 504, sub-project 506, sub-project 508, sub-project 510, and sub-project 512. Each sub-project is shown as having various different areas on the figure in order to show that each sub-project can have a different scale in terms of difficulty, size, or some other parameter. Most sub-projects are performed in a particular order, though some sub-projects could be performed in parallel.

Each sub-project reflects a particular aspect of building major information technology project 302. In a non-limiting example, each sub-project has a particular purpose described as follows. Sub-project 502 is a sub-project to implement the physical machinery and wiring used to implement major information technology project 302. Sub-project 504 is a project to create a new database used in major information technology project 302. Sub-project 506 is a project to create a new software application useful for performing temporal analysis on data. Sub-project 508 is a project to convert existing data to a new format. Sub-project 510 is a project to create a graphical user interface for interacting with the database to be defined in sub-project 504. Sub-project 512 is a project to develop a second database.

Although sub-projects 502 through 512 are described in terms of specific examples, many other types of sub-projects exit. Additionally, major information technology project 302 can include more or fewer sub-projects. Most major information technology project 302 would have many more sub-projects. Moreover, sub-projects 502 through 512 could each include one or more smaller sub-projects. Each smaller sub-project is used to plan construction of the corresponding larger sub-project. Conceivably, smaller sub-projects could also include deeper levels of sub-projects.

Figure 6:
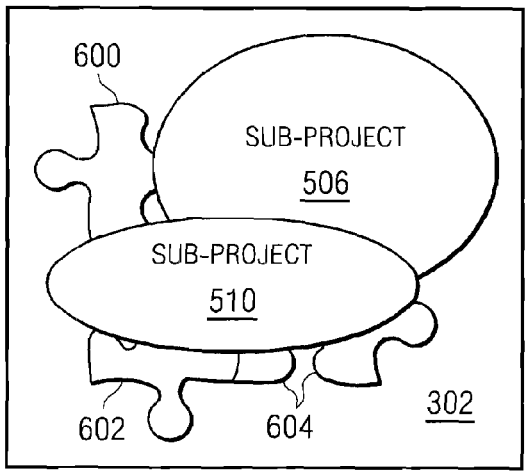
FIG. 6 is a block diagram illustrating major information technology sub-projects that inefficiently overlap underlying realities of existing information technology systems as a result of the prior art method shown in FIG. 4.

FIG. 6 is a block diagram illustrating major information technology sub-projects that inefficiently overlap underlying realities of existing information technology systems as a result of the prior art method shown in FIG. 4. As stated previously, the prior art method show in FIG. 4 of generating sub-projects for major information technology project 302 is unsatisfactory. The prior art method shown in FIG. 4 is unsatisfactory because the prior art method often results in total failure of major information technology project 302 or results in a final major information technology project that has unacceptable inefficiencies.

The cause of this result is illustrated in FIG. 6. In broad terms, the prior art method shown in FIG. 4 does not take into account the underlying technical realities of existing systems in "as-is" model 404. In other words, the prior art method shown in FIG. 4 is not data centric. A method of creating a major information technology project is data centric when the method is based on empirical data, even if the empirical data includes subjective considerations that have been reduced to data models.

For example, major information technology project 302 shows sub-project 506 and sub-project 510 as defined according to the method shown in FIG. 4. However, each of sub-project 506 and sub-project 510 overlap multiple "as-is" conceptual objects. An "as-is" conceptual object is some underlying physical information technology-related thing. An "as-is" conceptual object can be an existing conceptual object. For example, sub-project 510 overlaps all three of "as-is" data structure 600, "as-is" data structure 602, and "as-is" data structure 604. Similarly, sub-project 506 overlaps both "as-is" data structure 600 and "as-is" data structure 604. Although blocks 600, 602, and 604 are characterized as "as-is" data structures, one or more of these blocks could be replaced with "as-is" applications, databases, physical hardware, or other "as-is" conceptual objects.

The overlap of sub-projects to multiple "as-is" conceptual objects shown in FIG. 6 illustrates why the prior art method shown in FIG. 4 often fails. Because sub-projects are designed without taking into account the underlying "as-is" conceptual objects, work on sub-projects proceeds without having all pertinent information. Those working on sub-project 506 do not appreciate that "as-is" data structure 600 will impact construction of both sub-project 506 and sub-project 510. As a result, duplicative effort may take place, resulting in possibly gross inefficiency. Alternatively, "as-is" data structure is not modified to handle the workload imposed by both sub-project 506 and sub-project 510, resulting in failure of both projects.

As stated above, FIG. 7 through FIG. 9 illustrate a summary of an illustrative embodiment for solving the problem described in FIG. 3 through FIG. 6. Common reference numerals used in different figures correspond to each other. Thus, for example, major information technology project 302 is the same in FIG. 3 through FIG. 9.

In particular, FIG. 7 is a block diagram illustrating a computer-implemented method of creating optimized sub-projects for a major information technology project, in accordance with an illustrative embodiment. The method shown in FIG. 7 can be implemented in one or more data processing systems, such as data processing systems 104, 106, 110, 112, and 114 in FIG. 1 and data processing system 200 shown in FIG. 2. The method shown in FIG. 7 can be implemented among multiple computers over a network, such as network 102 shown in FIG. 1.

FIG. 7 illustrates a counter-intuitive method 700 of selecting a set of optimized sub-projects into a plan for creating an optimal project definition. Instead of proceeding from a "right to left" perspective shown in FIG. 4, the illustrative embodiment shown in FIG. 7 solves the problem of planning major information technology problem 302 from "left to right." Specifically, the term "left to right" in this context means that the illustrative process first defines a solution model 702, instead of defining the problem—as in FIG. 4.

The solution model 702, resources 400, constraints 402, and political concerns 706 are all described in terms of data that can be manipulated by a computer-implemented process. Thus, the definition of solution model 702, resources 400, constraints 402, and political concerns 706 are provided to optimization engine 704. An optimization engine is a computer-implementable software application that performs rigorously defined mathematically optimization, as defined above, on inputs 702, 706, 400, and 402.

After feedback 708, the output of optimization engine is an optimized major information technology project 302 having optimally selected sub-projects 710. The term "optimally selected sub-projects" means that the sub-projects were selected via a mathematical optimization project.

The process, however, usually proceeds through several adjustments and iterations in order to bring the optimized major information technology project 302 into closer agreement with expectations of those responsible for major information technology project 302. Thus, feedback process 708 allows a user or process to adjust one or more of solution model 702, resources 400, constraints 402, or political concerns 706 and then re-execute optimization engine 704.

Ultimately, the result of the process shown in FIG. 7 is an optimized major information technology project 302 having optimally selected sub-projects 710 that are in accord with expectations of those responsible for major information technology project 302. The process shown in FIG. 7 is data centric. In other words, the process shown in FIG. 7 is based on data and mathematical characterizations of factors important to major information technology project 302. As a result, as shown in FIG. 8 and FIG. 9, the optimally selected sub-projects 710 more closely reflect underlying realities of "as-is" conceptual objects. Thus, by using the method shown in FIG. 7, the probability of success of completing an efficient major information technology project 302 is greatly increased.

FIG. 8 is a block diagram illustrating optimally selected sub-projects for a major information technology project, in accordance with an illustrative embodiment. The optimally selected sub-projects shown in FIG. 8 are different than the non-optimally selected sub-projects shown in FIG. 6. Thus the shapes of sub-project 800, sub-project 802, sub-project 804, sub-project 806, sub-project 808, sub-project 810, and sub-project 812 are different than the various sub-projects shown in FIG. 6. Optimally selected sub-projects shown in FIG. 8 are part of major information technology project 302.

By implementing optimally selected sub-projects 800 through 812 in a particular order, which could be parallel implementation in some instances, the probability of successfully implementing major information technology project 302 is substantially increased.

FIG. 9 is a block diagram illustrating major information technology sub-projects that efficiently overlap underlying realities of existing information technology systems, in accordance with an illustrative embodiment. FIG. 9 illustrates why the process shown in FIG. 7 is superior to the prior art method shown in FIG. 3.

Unlike in FIG. 6, which is a result of the prior art method shown in FIG. 4, the shown optimally selected sub-projects directly overlap underlying conceptual data objects. For example, optimally selected sub-project 800 corresponds directly to conceptual data object 600 without overlapping conceptual data object 602. Similarly, optimally selected sub-project 802 directly corresponds to conceptual data object 602 without overlapping conceptual data object 600. Thus, duplicative effort is avoided and major information technology project 302 is much more efficiently produced. Additionally, major information technology project 302 operates more efficiently when completed.

Figure 10:
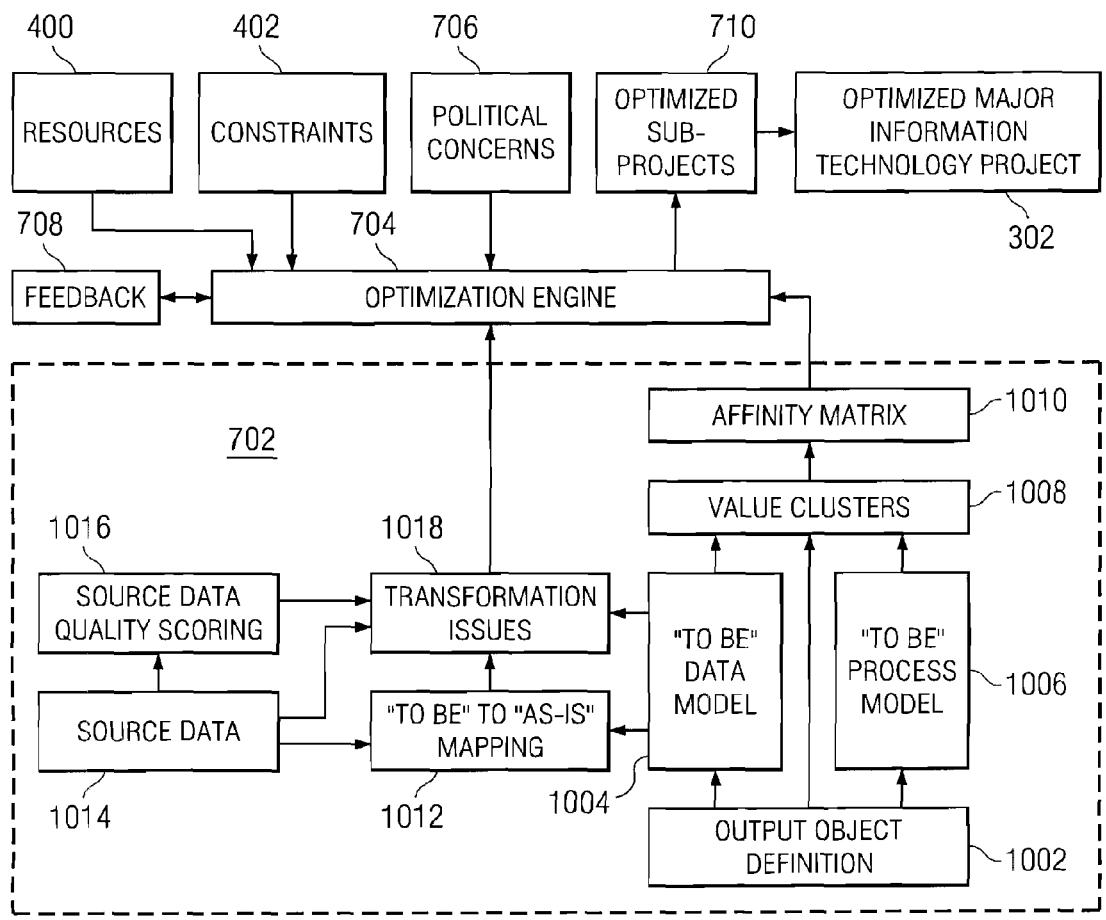
FIG. 10 is a block diagram illustrating a method of creating optimized sub-projects for a major information technology project, in accordance with an illustrative embodiment.

FIG. 10 is a block diagram illustrating a method of creating optimized sub-projects for a major information technology project, in accordance with an illustrative embodiment. In particular, the method shown in FIG. 10 is a more detailed version of the method shown in FIG. 7. Thus, corresponding reference numerals shown in FIG. 10 correspond to like numerals shown in FIG. 7. The method shown in FIG. 10 can be implemented in one or more data processing systems, such as data processing systems 104, 106, 110, 112, and 114 in FIG. 1 and data processing system 200 shown in FIG. 2. The method shown in FIG. 10 can be implemented among multiple computers over a network, such as network 102 shown in FIG. 1.

As in FIG. 7, solution model 702, resources 400, constraints 402, and political concerns 706 are provided to optimization engine 704. In conjunction with optional feedback 708, optimization engine creates optimized major information technology project 302 having optimally selected sub-projects 710. However, the method shown in FIG. 10 details solution model 702.

Construction of solution model 702 begins with creating output object definitions 1002. Output objects are those outputs or deliverables that the project is designed to deliver. Specific examples of output objects include screen shots showing particular information, pictures, or query results; reports; services delivered; applications; queries; and others. Output objects are decomposed into three types of conceptual data objects: output data objects, process data objects, and connector data objects that connect the former two data objects. Output data objects are data objects that represent data and data structures, such as databases and other similar data objects. Process data objects are data objects that represent processes used to create the output objects, such as applications, algorithms, and flows.

For example, an output object could be a report. Decomposing this output object results in a corresponding output data object that is data that identifies or represents the report. Additionally, the report is decomposed into the logical processes used to create the report. Continuing the example, the each of three applications, algorithms, or flows used to create the report are identified and represented as a data object that can be called an output process object.

The sum of decomposed output data objects are then collected and assimilated into "to be" data model 1004. "To-be" data model 1004 is a model of all output data objects, data structures desired or needed for the output data objects, and any other data objects desired to implement optimized major information technology project 302. "To be" data model 1004 is data assembled into data models appropriate to producing one or more optimized sub-projects. A "to be" data structure therefore includes one or more data objects, as defined above.

Different parts of "to be" data model 1004 may be at different levels of completeness. Thus, an example of "to be" data model 1004 is a data structure that shows the "skeleton" of a massive database that is to be constructed. Although not all information regarding the future database is available, the "to be" model of the database describes the structure of the database and what information it should contain.

Similarly, the sum of decomposed output process objects are collected and assimilated into "to be" process model 1006. "To-be" process model 1006 is a model of processes and flows desired to implement optimized major information technology project 302. "To be" process model 1006 is data assembled into data models appropriate to producing one or more optimized sub-projects. A "to be" process therefore includes one or more data objects, as defined above.

Different parts of "to be" process model 1006 may be at different levels of completeness. Thus, an example of "to be" data model 1006 is an application that has not yet been written or that is incomplete. Although not all information regarding the future application is available, the "to be" model of the application describes the structure of the application and what information it should contain.

Next, "to be" data model 1004 and "to be" process model 1006 are arranged into value clusters. Possibly, connector data objects generated during output object definition 1002 are also integrated into value clusters 1008. A value cluster is the discrete intersection of data and that data's ability to add value to an organization. A value cluster may also be considered a group of resources that, when taken together, support one or more output objects having a utility value to an organization.

Value clusters 1008 may be considered a group of data value clusters, process value clusters, and connector value clusters. Each data value cluster includes one or more data sources that support one or more data objects. Each process value cluster includes one or more logical processes that support one or more output objects.

Value clusters 1008 are then related to each other using affinity matrix 1010. Affinity matrix 1010 is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Values clusters 1008, through affinity matrix 1010 are provided to optimization engine 704. Optimization engine 704 then performs mathematical optimization operations, taking as input affinity matrix 1010.

Returning to "to be" data model 1004, additional considerations are taken into account. For example, "to-be" data structures are mapped to "as-is" data structures, taking as input data source 1014. An "as-is" data structure is an existing data structure. Often, "as-is" data or data structures are not in a format compatible with final optimized major information technology project 302. Thus, the mapping of "to-be" data and data structures to "as-is" data and data structures is characterized as a conceptual data object.

Together with source data quality scoring 1016, mapping 1012 is modeled according to transformation issues 1018. Transformation issues 1018 are rigorously defined transformation risks and problems involved with mapping 1012 "to be" data and data structures to "as-is" data and data structures. Examples of transformation issues 1018 include estimated costs for source to target conversion, estimated risk for source to target conversion, and other similar issues.

As described above, when considered as a whole output object definition 1002, "to be" data model 1004, "to be" process model 1006, value clusters 1008, affinity matrix 1010, "to be" to "as is" mapping 1012, source data 1014, source data quality scoring 1016, and transformation issues 1018 form solution model 702. Solution model 702 is provided as input into optimization engine 704, along with resources 400, constraints 402, political concerns 706, and feedback 708. As a result of performing optimization, a deterministic optimized major information technology project 302 is produced with optimally selected sub-projects 710.

FIGS. 11 through 25 illustrate various components and aspects of the features of FIG. 10. Thus, corresponding reference numerals in the different figures refer to the same features.

Figures 11, 12:
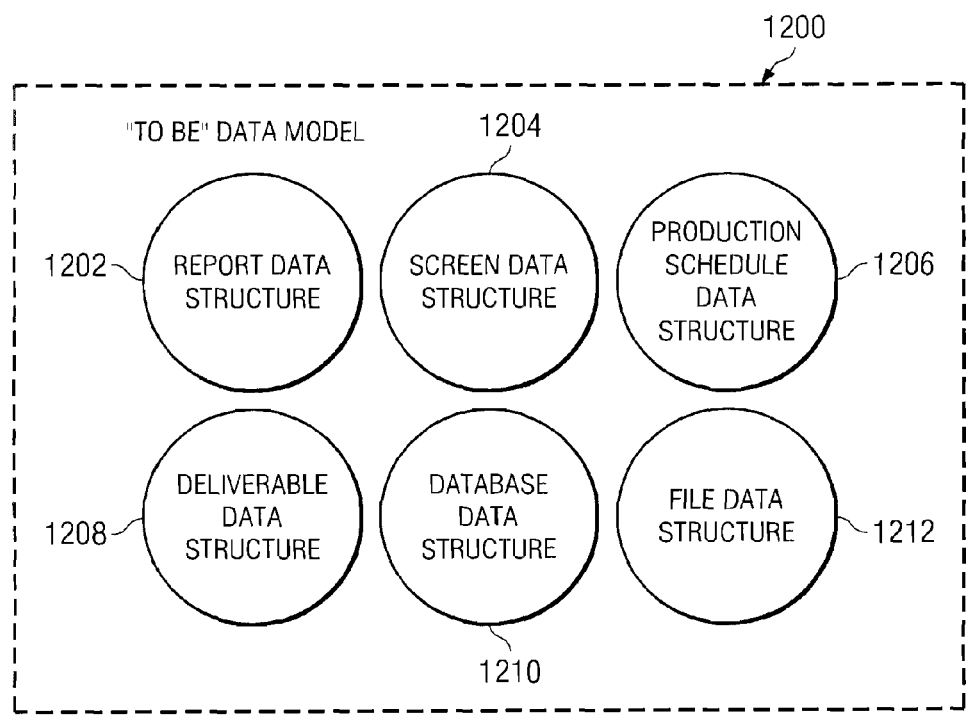
FIG. 11 is an exemplary output object valuation matrix, in accordance with an illustrative embodiment.
FIG. 12 is a block diagram of a "to be" data model, in accordance with an illustrative embodiment.

FIG. 11 is an exemplary output object valuation matrix, in accordance with an illustrative embodiment. An output object valuation matrix reflects valuation data, which is data that describes the value of an output object or a resource to an organization. An output object valuation matrix can be implemented as data and a data structure usable by a data processing system, such as data processing systems 104, 106, 110, 112, and 114 in FIG. 1 and data processing system 200 shown in FIG. 2. Exemplary output object valuation matrix 1100 shown in FIG. 11 can be implemented among multiple computers over a network, such as network 102 shown in FIG. 1. Additionally, output object valuation matrix 1100 shown in FIG. 11 describes the value of various projects, such as optimized sub-projects 800 through 812, to an organization. Output object valuation matrix 1100 is useful for determining affinity matrix 1010 in FIG. 10 and can also be used as input in optimization engine 704.

As shown in FIG. 11, columns 1102 reflect various sub-organizations within the overall organization. Rows 1104 reflect projects. Different sub-organizations within the organization can value different projects differently. Output object valuation matrix takes these different valuations into account when creating an optimized major information technology project for which optimized sub-projects are selected.

Rows 1104 include information technology sub-project 1106, management sub-organization 1108, marketing sub-organization 1110, and production sub-organization 1112. Additional sub-organizations or different sub-organizations could exist.

Columns include project 1 1114 and project 2 1116. Examples of projects could include an optimized sub-project, as described above. Additional projects or a different number of sub-projects could exist. A specific example of a project could include establishing a database, creating an application, generating a graphical user interface, or any other project.

An intersection of a row and a column can be referred to as a cell. Each cell contains a real number. The real number is a relative valuation of a project to an organization. High numbers reflect greater importance. Low numbers reflect lower importance. A zero indicates that a project has no importance to the organization. A negative number indicates that a project is a detriment to the organization.

For example, project 1 1114 has a value of 100 to management sub-organization 1108 and project 2 1116 has a value of 400 to management sub-organization 1108. Thus, project 2 1116 is considered to be much more important to the management sub-organization 1108 than project 1 1114. Similarly, both project 1 1114 and project 2 1116 are more important to management sub-organization 1108 than to the other sub-organizations.

In turn, project 1 1114 has no value to marketing sub-organization 1110. For example, project 1 could be creation of a database with which marketing sub-organization 1110 does not interact.

However, project 1 1114 has a negative value to production sub-organization 1112. For example, project 1 1114 could interfere with operation of production sub-organization 1112 because project 1 1114 drains production sub-organization 1112 of resources needed by that organization. This fact could motivate a change in project 1, a change in production sub-organization 1112, or a change in some other part of major information technology project 302 shown in FIG. 3.

FIG. 12 is a block diagram of a "to be" data model, in accordance with an illustrative embodiment. "To be" data model 1200 corresponds to "to be" data model 1004 in FIG. 10.

A "to be" data model includes a group of "to be" data structures and "to be" data. The phrase "to be", as used herein, describes something that is desired for the major information technology project that may, or may not, yet exist. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Examples of "to be" data structures in "to be" data model 1200 include report data structure 1202, screen data structure 1204, production schedule data structure 1206, deliverable data structure 1208, database data structure 1210, and file data structure 1212. Additional "to be" data structures or different "to be" data structures could be included in "to be" data model 1200.

Report data structure 1202 could be a data structure detailing data or data structures desired, whether available or not, for a report output object. Similarly, screen data structure 1204 could be a data structure detailing data or data structures desired, whether available or not, for a screen output object. Likewise, production schedule data structure 1204 could be a data structure detailing data or data structures desired, whether available or not, for a production schedule output object. Likewise, deliverable data structure 1206 could be a data structure detailing data or data structures desired, whether available or not, for a deliverable output object. Likewise, database data structure 1210 could be a data structure detailing data or data structures desired, whether available or not, for a database output object. Finally, file data structure 1212 could be a data structure detailing data or data structures desired, whether available or not, for a file output object.

Taken together, the set of all "to be" data structures, and possibly relationships among the "to be" data structures, form "to be" data model 1200. "To be" data model 1200 will then be used as shown in FIG. 10.

Figure 13:
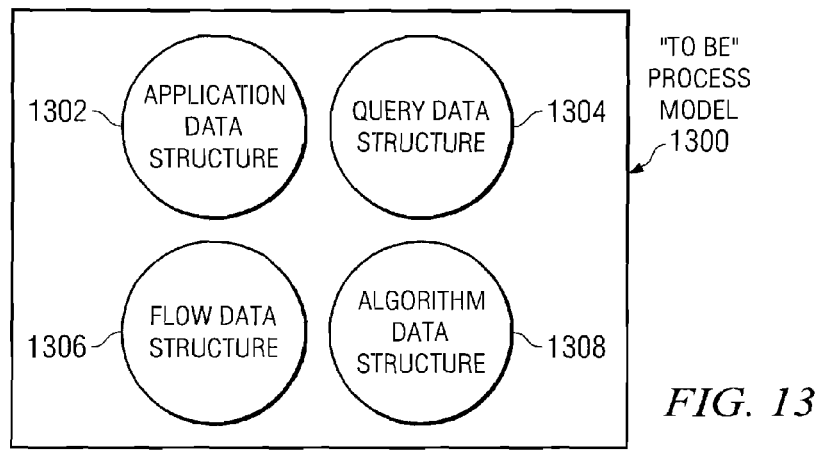
FIG. 13 is a block diagram of a "to be" process model, in accordance with an illustrative embodiment.

FIG. 13 is a block diagram of a "to be" process model, in accordance with an illustrative embodiment. "To be" data model 130 corresponds to "to be" data model 1006 in FIG. 10.

A "to be" process model includes a group of "to be" data structures and "to be" data reflective of a process used to implement an output object. The phrase "to be", as used herein, describes something that is desired for the major information technology project that may, or may not, yet exist. Different parts of the "to be" process model may be at different levels of completeness. An example of a "to be" data structure in a "to be" process model is a data structure that describes a massive application to be used in the major information technology project. Although not all information regarding the future application is available, the "to be" model of the application describes the structure of the application and what capabilities it should have.

Examples of "to be" data structures in "to be" process model 1300 include application data structure 1302, query data structure 1304, flow data structure 1306, and algorithm 1308. Additional "to be" data structures or different "to be" data structures could be included in "to be" process model 1300.

Application data structure 1302 could be a data structure detailing data or data structures desired, whether available or not, for an application output object. Similarly, query data structure 1304 could be a data structure detailing data or data structures desired, whether available or not, for a query output object. Likewise, flow data structure 1306 could be a data structure detailing data or data structures desired, whether available or not, for a flow output object. Finally, algorithm data structure 1308 could be a data structure detailing data or data structures desired, whether available or not, for an algorithm output object.

Taken together, the set of all "to be" process data structures, and possibly relationships among the "to be" process data structures, form "to be" process model 1300. "To be" process model 1300 will then be used as shown in FIG. 10.

Figure 14:
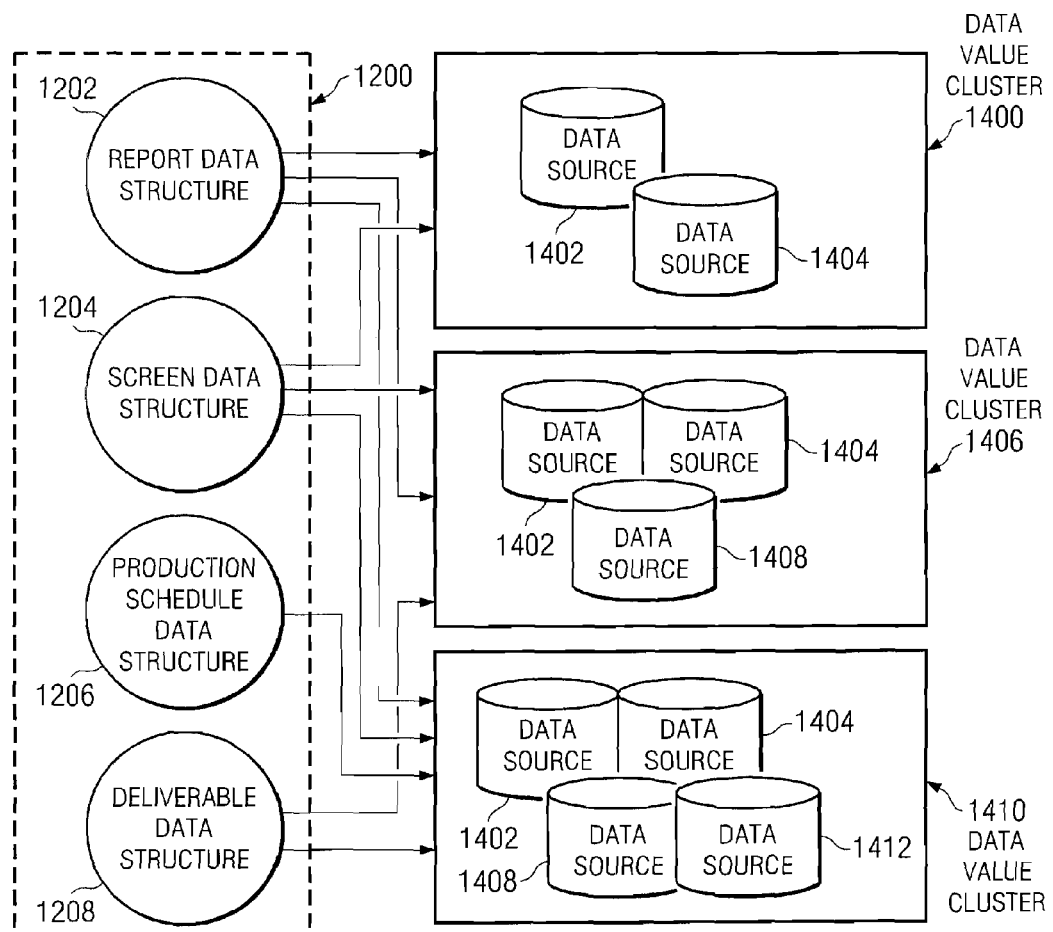
FIG. 14 is a block diagram illustrating data value clusters, in accordance with an illustrative embodiment.

FIG. 14 is a block diagram illustrating data value clusters, in accordance with an illustrative embodiment. The process of forming data value clusters can be implemented using a data processing system, such as data processing systems 104, 106, 110, 112, and 114 in FIG. 1 and data processing system 200 shown in FIG. 2. Data value clusters can be implemented among multiple computers over a network, such as network 102 shown in FIG. 1. As described above, a data value cluster is the discrete intersection of data and that data's ability to add value to an organization.

To form data value clusters, data structure models from "to be" data model 1200 are associated with different common data sources in data value clusters. For example, data value cluster 1400 includes data source 1402 and data source 1404. Report data structure model 1202 and screen data structure model 1204 each take advantage of these data sources in data value cluster 1400. Report data structure model 1202 also takes advantage of data value cluster 1406, which contains data source 1402, data source 1404, and data source 1408. Report data structure model 1202 also takes advantage of data value cluster 1410, which includes data source 1402, data source 1404, data source 1408, and data source 1412. Different data structure models are associated with different data value clusters as shown.

Structurally, data value clusters are implemented using matrices. Each value cluster is analyzed for its political and economic value to an organization or activities of an organization. Political power is expressed as a floating point number between 0.0 and positive infinity. Zero is totally powerless and positive infinity is an organization that receives anything it requests, if within the power of the organization. Example corporate organizations with a political power of infinity are the audit, compliance, and Sarbanes-Oxley compliance organizations. Other legal, tax, and environmental laws must be complied with, so no tradeoffs exist versus normal organizational goals. Most normal organizations would have a scaled political power value between 0.0 and 1.0. The absolute values of political power do not matter, only the political power ratio effects value cluster selection.

For example, relative political power can be objectively quantified in data value clusters using the following mathematics. Initially, an organization index is produced, where, $$0 \leq PP_{X=1}^{N} \leq \infty$$

Where X is the organizational index from 1 to N organizations.

Each of the value clusters provides some non-negative value to each of the X organizations. For the C value clusters projects considered by the planning unit, the value of each proposed cluster is:

$$0 \leq VC_{X,C}$$

Where X is the organization index and C is the index of the value cluster, and VC is the value cluster.

For each value cluster there exists a cost to extract, transform, and load the data to provision a particular value cluster. That cost is a non-negative number, and the cost of each value cluster is less than or equal to the total budget available, as shown by the following inequality:

$$0 \leq Cost_{D=1}{}^C \leq Budget$$

Where C is the total number of value clusters and Budget is the total budget available.

The optimal value cluster selection is a binary vector composed of zeros and ones that indicates the selection and funding of particular projects. This binary vector can be considered the "answer". As the optimization algorithm is run, various combinations of value clusters are computed in an attempt to increase the total value of an objective function described below. This process is well known in the art.

$$Plan_{Y=1}{}^C \in 0,1$$

Where Plan sub Y is 1 if production of the corresponding value cluster is selected and zero otherwise.

The methods described herein maximize the total value of the selected value clusters for the entire organization subject to a series of constraints. The objective function that is maximized is:

$$\text{Maximize} \sum_{X=1}^{M} \sum_{Y=1}^{C} PP_X \cdot Plan_Y \cdot VC_{X,Y}$$

Where M=maximum organizational index and C=number of value clusters.

The production of a given value cluster may deliver value to more than one part of the organization. For instance, a new production planning system may deliver value to a manufacturing department by improving manufacturing efficiency. This same value cluster may also deliver value to the marketing department by allowing sales persons to know when a particular order for a given customer will ship. The shipping department may also receive value by being able to negotiate favorable shipping rates by more accurate prediction of shipping needs.

Constraint data are added to reflect various constraints on the organization, such as physical, financial, organizational, legal, ethical, staffing, infrastructure, scheduling, and operational realities. For example, the total costs for all selected value cluster projects is less than or equal to the total budget available, as reflected in the following equation:

$$\text{Subject to: } 0 \leq \sum_{Y=1}^{C} PP_Y \cdot Cost_Y \leq Budget$$

Where Cost sub Y is the cost of producing value cluster number j.

Other constraints may be added to reflect the managerial or political considerations of the organization. For instance, if every organizational unit must receive at least 5% of their requested cluster values, a possible constraint would be:

$$\text{For all dept, } \left( \sum_{P=1}^{C} .05 * VC_{X,P} \right) \leq \left( \sum_{Q=1}^{C} Plan_Q * VC_{X,Q} \right)$$

Where X=department index, Q=project index, and Plan sub Q is the value cluster selection vector.

Other mathematical constraints can be added to more accurately reflect physical realities and management objectives. Thus, value clusters are objective, data-centric objects, such as matrices, that can be used as inputs in an optimization engine.

Figure 15:
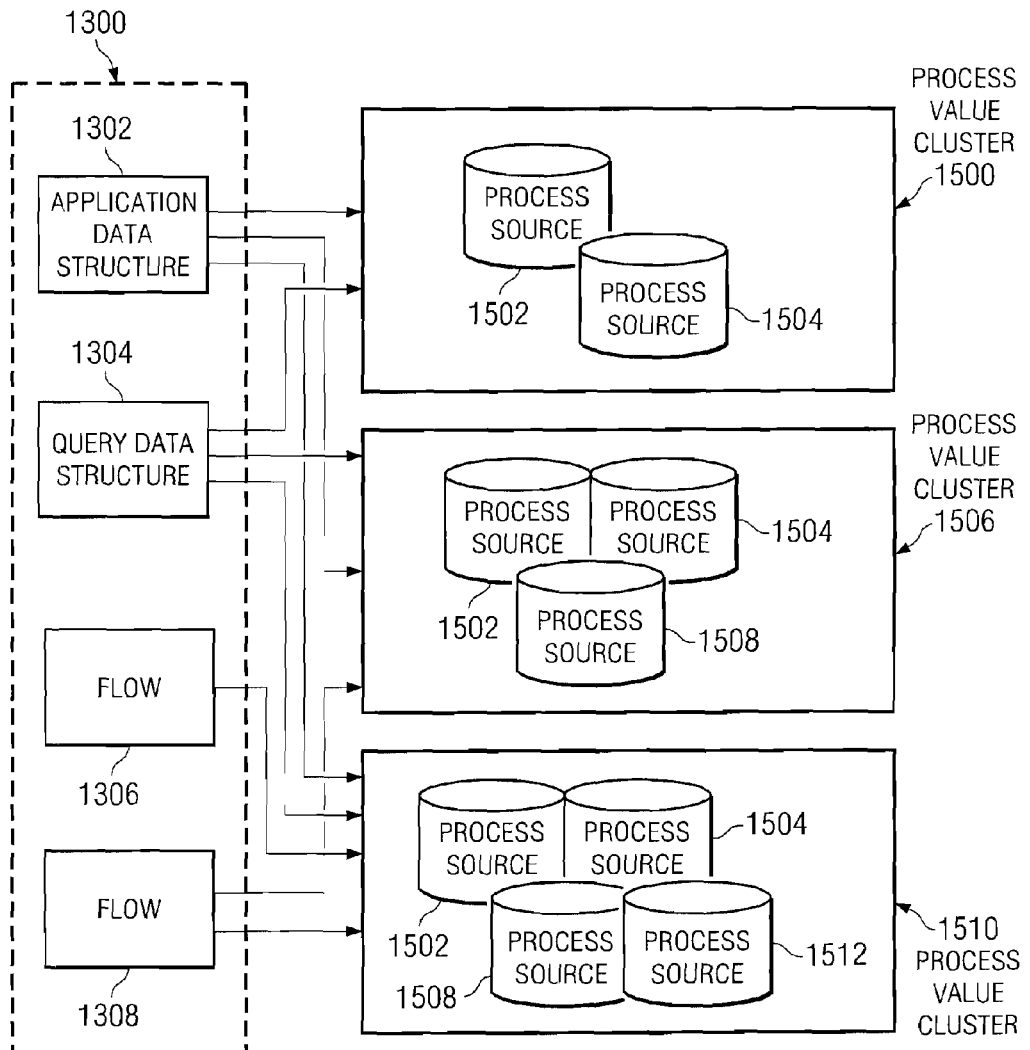
FIG. 15 is a block diagram illustrating process value clusters, in accordance with an illustrative embodiment.

FIG. 15 is a block diagram illustrating process value clusters, in accordance with an illustrative embodiment. The process of forming process value clusters can be implemented using a data processing system, such as data processing systems 104, 106, 110, 112, and 114 in FIG. 1 and data processing system 200 shown in FIG. 2. Process value clusters can be implemented among multiple computers over a network, such as network 102 shown in FIG. 1.

To form process value clusters, process data structure models from "to be" process model 1300 are associated with different common process sources in process value clusters. A process source can be an existing application, algorithm, or flow, or a similar process that is to be developed. For example, process data value cluster 1500 includes process source 1502 and process source 1504. Application process data structure model 1302 and Application process data structure model 1304 each take advantage of these process sources in process value cluster 1500. Application process data structure model 1302 also takes advantage of process value cluster 1506, which contains process source 1502, process source 1504, and process source 1508. Application process data structure model 1302 also takes advantage of process value cluster 1510, which includes process source 1502, process source 1504, process source 1508, and process source 1512. Different process data structure models are associated with different process value clusters as shown.

Figure 16:
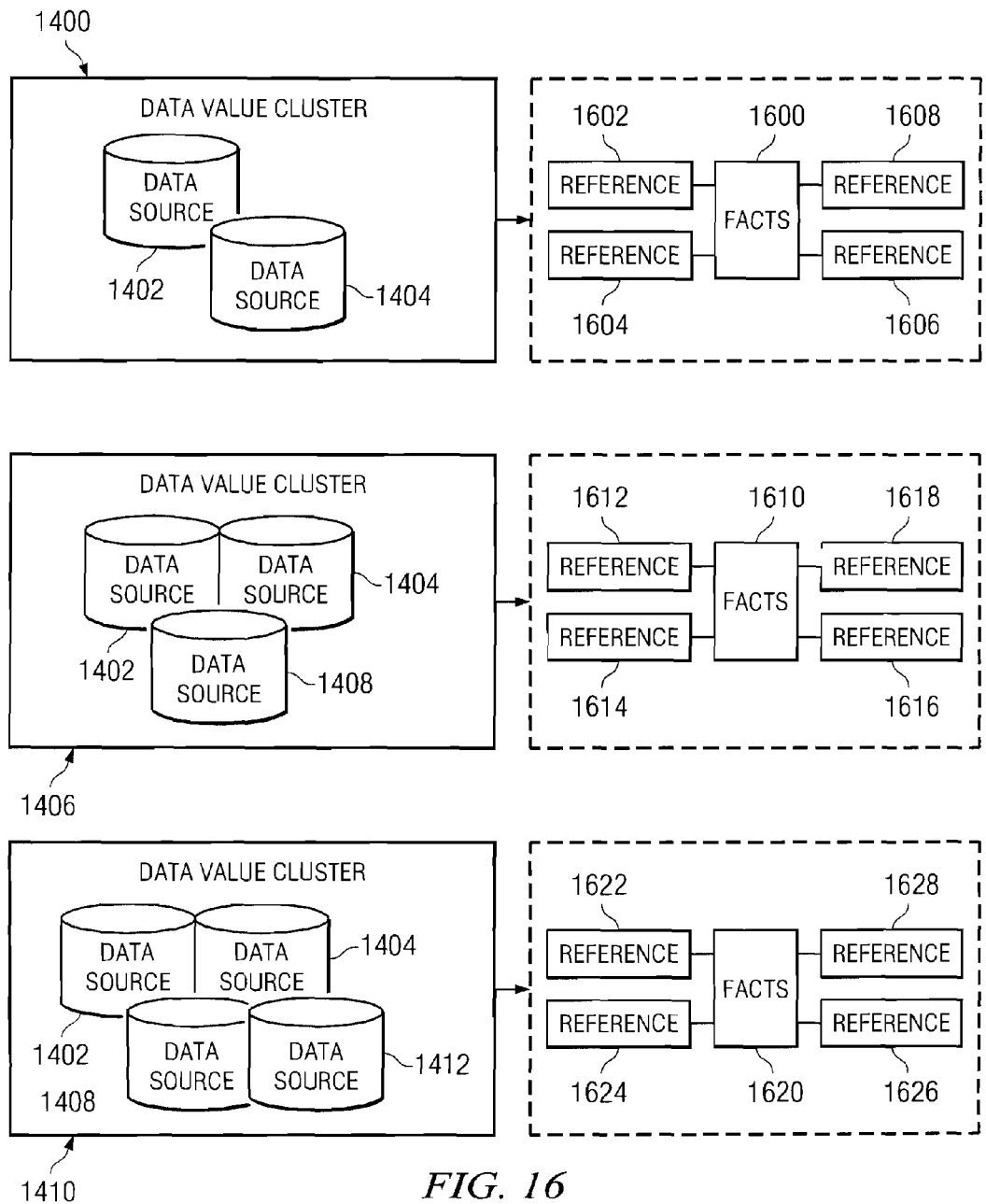
FIG. 16 is a block diagram illustrating elements of a "to be" data model, in accordance with an illustrative embodiment.

FIG. 16 is a block diagram illustrating elements of a "to be" data model, in accordance with an illustrative embodiment. Data value clusters shown in FIG. 16 correspond to data value clusters shown in FIG. 14.

For example, data value cluster 1400, which contains data source 1402 and data source 1404, are related to a set of facts 1600. Set of facts 1600 refers to a variety of references, such as reference 1602, reference 1604, reference 1606, and reference 1608. Similarly, data value cluster 1406, which includes data sources 1402, 1404, and 1408, are related to set of facts 1610. Set of facts 1610 refers to a variety of references, such as reference 1612, reference 1614, reference 1616, and reference 1618. Likewise, data value cluster 1410, which includes data sources 1402, 1404, 1408, and 1412 are related to set of facts 1620. Set of facts 1620 refers to a variety of references, such as reference 1622, reference 1624, reference 1626, and reference 1628.

FIG. 16 shows that to obtain certain data certain data sources should be developed or accessed and to be able to satisfy requirements of a project. The shown boxes are connected to provide a classic representation of a data model. The data value clusters shown in FIG. 16 tie to those data that enable individual sub-projects to work by producing corresponding particular output objects.

FIG. 17 is a block diagram illustrating elements of a "to be" process model, in accordance with an illustrative embodiment. Process value clusters shown in FIG. 17 correspond to process value clusters shown in FIG. 15.

Process value clusters correspond to different processes in various optimized sub-projects. For example, process value cluster 1500, which includes process sources 1502 and 1504 is used by optimized sub-project 804 and optimized sub-project 808. Similarly, process value cluster 1506, which includes process sources 1502, 1504, and 1508, is used by optimized sub-projects 806 and 812. Likewise, process value cluster 1510, which includes process sources 1502, 1504, 1508, and 1510, is used by optimized sub-projects 800, 804, 806, and 812.

The knowledge of how process value clusters relate to projects can be used to optimally select sub-projects for an optimized project. For example, if sub-projects 804 and 808 have been completed already, then process value cluster 1500 is also complete, which means that process source 1502 and process source 1504 are available. If process source 1508 were to be developed, then process value cluster 1506 would be completed. Thus, sub-project 806 and sub-project 812 would be easily finished. Thus, the process value clusters allow for detailed, data-centric planning of which sub-projects should be completed in what order. The process can be two-way: The completion of projects also allows process value clusters to be delivered.

FIG. 18 is an exemplary affinity matrix, in accordance with an illustrative embodiment. The process of forming an affinity matrix can be implemented using a data processing system, such as data processing systems 104, 106, 110, 112, and 114 in FIG. 1 and data processing system 200 shown in FIG. 2. An affinity matrix can be implemented among multiple computers over a network, such as network 102 shown in FIG. 1.

Affinity matrix 1800 is a matrix of data that indicates a relationship between groups of data sources and groups of output objects, and/or groups of available logical processes and groups of output objects. Affinity matrix 1800 describes data sources and output objects in terms of what output objects are available based on what data sources are available. Thus, for example, affinity matrix 1800 can allow a user to determine that if Output Object "X" is available because its data sources are available, then Output Object "Y" and Output Object "Z" are also available because they use similar data sources.

Specifically, affinity matrix 1800 has a series of columns 1802 reflecting existing data sources and a series of rows 1804 corresponding to data structures in FIG. 12 and FIG. 13. For columns 1802, existing data sources include "as-is" data sources and any data sources that have been completed during the course of constructing the major information technology project. Thus, affinity matrix 1800 evolves over time and can be adjusted as part of a feedback process, such as feedback 708 in FIG. 10. In the illustrative example shown, columns 1802 include data source column 1806, data source column 1808, data source column 1810, data source column 1812, and data source column 1814.

Affinity matrix 1800 also has a series of rows 1804 of data structures corresponding to data structures in FIG. 12 and FIG. 13. For example, rows 1804 include report data structure row 1202, screen data structure row 1204, production schedule data structure row 1206, deliverable data structure row 1208, application data structure row 1302, application data structure row 1304, flow data structure row 1306, and flow data structure row 1308. Rows 1804 also include personal skills program data structure row 1818 and opportunities database for sales data structure row 1820. Rows 1818 and 1820 are newly added data structures corresponding to newly added output objects as a result of a feedback process. Thus, again, affinity matrix 1800 evolves over time and can be adjusted as part of a feedback process, such as feedback 708 in FIG. 10.

An intersection of a column and a row can be referred to as a cell. Each cell has a number that is either zero or one. A zero indicates that a data source is not needed or is incomplete for a particular output object data structure in rows 1804. A one indicates that a data source exists and is used for a particular output object data structure in rows 1804. For this reason, as the major information technology project proceeds towards completion, more ones will appear in affinity matrix 1800 until every cell has a one when the major information technology project is completed. Thus, for example, report data structure 1202 either does not rely on or does not yet have available data sources 1806, 1808, 1810, and 1812; however, report data structure 1202 uses data source 1814. Furthermore, data source 1814 also exists and is available.

Affinity matrix 1800 can be used to estimate the ease or difficulty of adding new output objects to the major information technology project. For example, personal skills program data structure 1818 has a one in column 1808 and opportunities database for sales data structure 1820 has a one in column 1808 and column 1814. Given that ones already exist for these columns in other rows, such as row 1208, one can immediately ascertain that at least those data sources already exist and are completed. In fact, a one exists in at least one row for every column in affinity matrix 1800. Thus, assuming that the personal skills program and opportunities database for sales output objects do not use some other data source not reflected in columns 1802, one can also immediately ascertain that adding the personal skills program and opportunities database for sales output objects would be relatively simple. Adding these output objects would be relatively simple because the data sources upon which these output rely already exist and are completed.

Figure 19:
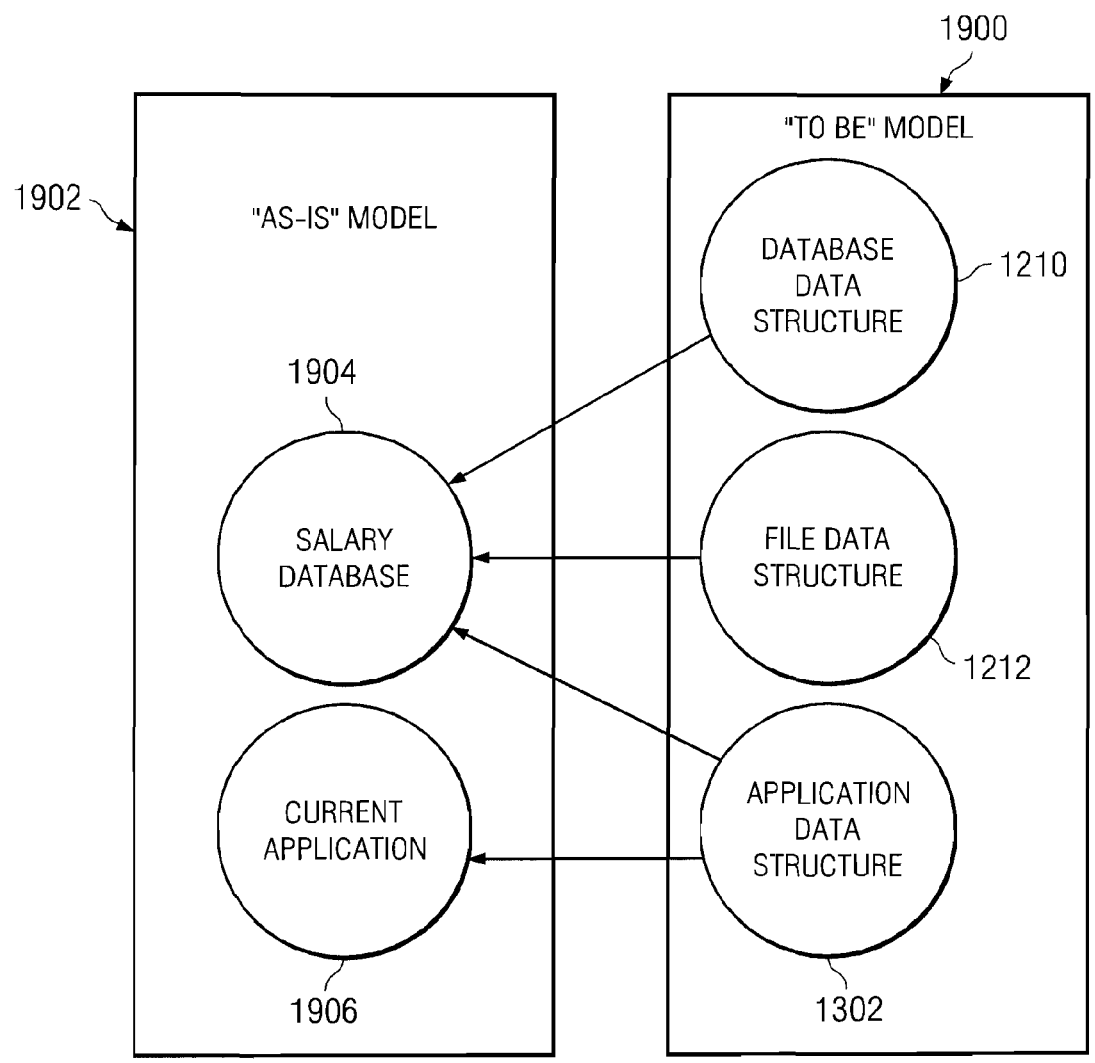
FIG. 19 is a block diagram illustrating mapping from an "as-is" model to a "to be" model, in accordance with an illustrative embodiment.

FIG. 19 is a block diagram illustrating mapping from an "as-is" model to a "to be" model, in accordance with an illustrative embodiment. FIG. 19 corresponds to mapping 1012 in FIG. 10. The mapping process shown in FIG. 19 can be implemented using a data processing system, such as data processing systems 104, 106, 110, 112, and 114 in FIG. 1 and data processing system 200 shown in FIG. 2. The mapping process shown in FIG. 19 can be implemented among multiple computers over a network, such as network 102 shown in FIG. 1.

"To be" model 1800 is mapped to "as-is" model 1802. During this process, "to be" data structures and "to be" process models are mapped to "as-is" data structures and "as is" processes. This mapping does not map all "to be" data structures and "to be" processes to all desired underlying data structures and processes, but rather to those data structures and processes that already exist. Thus, the mapping process shown in FIG. 19 describe how "to be" data structures and "to be" processes can take advantage of existing, or "as is", data structures and existing, or "as is", processes.

In the example shown in FIG. 19, database data structure 1210, file data structure 1212, and application data structure 1302 are all mapped to salary database 1904, which is an existing database. In other words, each of data structures 1210, 1212, and 1302 take advantage of or use salary database 1904. However, only application data structure 1302 takes advantage of or uses current application 1906. Thus, application data structure 1302 is mapped to current application 1906.

Figure 20:
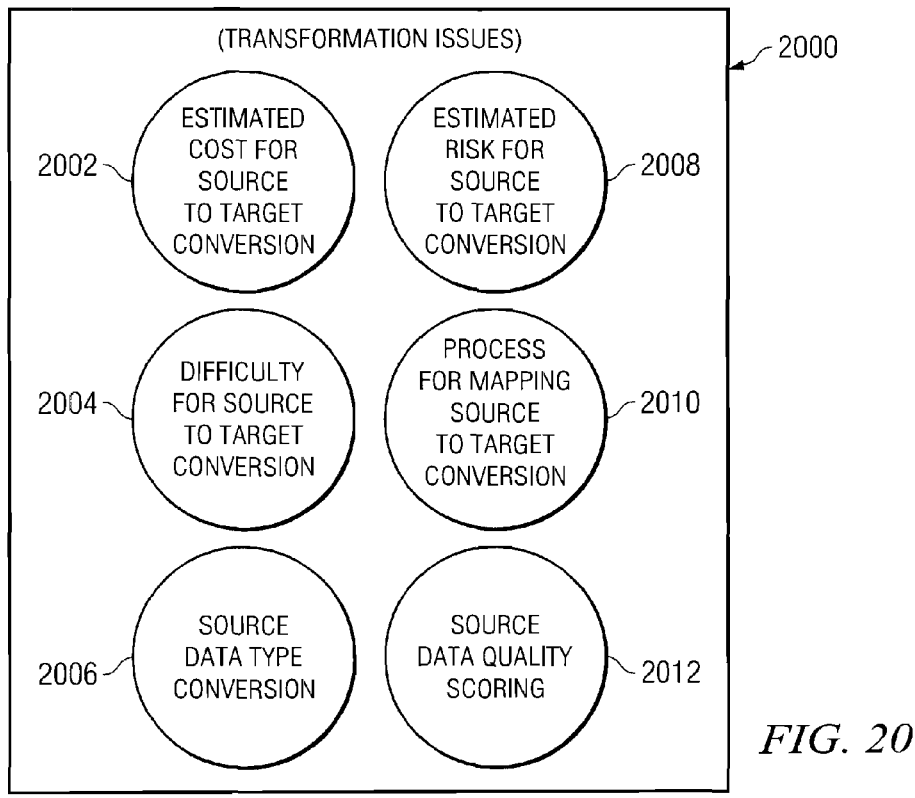
FIG. 20 is a block diagram illustrating transformation issues applied to the mapping from an "as-is" model to a "to be" model, in accordance with an illustrative embodiment.

FIG. 20 is a block diagram illustrating transformation issues applied to the mapping from an "as-is" model to a "to be" model, in accordance with an illustrative embodiment. FIG. 20 corresponds to transformation issues 1018 in FIG. 10. The transformation issues shown in FIG. 20 can be described as data in a data processing system, such as data processing systems 104, 106, 110, 112, and 114 in FIG. 1 and data processing system 200 shown in FIG. 2. The transformation issues described in FIG. 20 can be implemented among multiple computers over a network, such as network 102 shown in FIG. 1.

Transformation issues 2000 are issues regarding transforming "as is" data structures and processes into "to be" data structures and processes. Transformation issues 2000 are quantitative factors that are defined and then provided as input to an optimization engine, such as optimization engine 704 in FIG. 7 and FIG. 10.

Examples of transformation issues include an estimated cost for source to target conversion 2002. This cost can be estimated and quantified, with the quantified value included as input in the optimization engine. Similar quantitative transformation issues include a quantitative assessment of the difficulty for source to target conversion 2004, source data type conversion 2006, estimated risk for source to target conversion 2008, process for mapping source to target conversion 2010 and source data quality scoring 2012.

FIG. 21 is a block diagram illustrating exemplary available resources, in accordance with an illustrative embodiment. FIG. 21 corresponds to resources 400 in FIG. 4 and in FIG. 10. Available resources 2100 in FIG. 21 can be described as data in a data processing system, such as data processing systems 104, 106, 110, 112, and 114 in FIG. 1 and data processing system 200 shown in FIG. 2. Available resources 2100 described in FIG. 21 can be implemented among multiple computers over a network, such as network 102 shown in FIG. 1. Additionally, available resources 2100 can be considered a type of boundary conditions provided as input into an optimization engine, such as optimization engine 704 in FIG. 7 and FIG. 10.

Available resources 2100 represent the accumulation of all available resources, as defined by the organization. Examples of available resources include physical computer equipment 2102, physical storage capacity 2104, training 2106, software 2108, money 2110, time available 2112, physical resources 2114 (such as buildings), network capability 2116, and personnel 2118. Available resources 2100 could be more, different, or fewer available resources than those shown in FIG. 21.

FIG. 22 is a block diagram illustrating exemplary project constraints, in accordance with an illustrative embodiment. FIG. 22 corresponds to constraints 402 in FIG. 4 and in FIG. 10. Project constraints 2200 in FIG. 22 can be described as data in a data processing system, such as data processing systems 104, 106, 110, 112, and 114 in FIG. 1 and data processing system 200 shown in FIG. 2. Project constraints 2200 described in FIG. 22 can be implemented among multiple computers over a network, such as network 102 shown in FIG. 1. Additionally, project constraints 2200 can be considered a type of boundary conditions provided as input into an optimization engine, such as optimization engine 704 in FIG. 7 and FIG. 10.

Project constraints 2200 represent the accumulation of all constraints, as defined by the organization. Examples of project constraints include problems in software, network, database, hardware mandates, and performance characteristics 2202. Other project constraints include data structure compatibility issues 2204, data quality issues 2206, database compatibility issues 2208, data quality 2210, team location and travel constraints 2212, cash shortages 2214, organizational rigidity 2216, personal restrictions 2218, organizational policies 2220, information transfer policies 2222, legal constraints 2224, classified information policies 2226, HIPPAA or other privacy rules 2228, hazardous information restrictions 2230, risk tolerance 2232, security requirements 2234, information technology (IT) policies 2236, development requirements 2238, and required delivery steps 2240. Project constraints 2200 could be more, different, or fewer available resources than those shown in FIG. 22.

Figure 23:
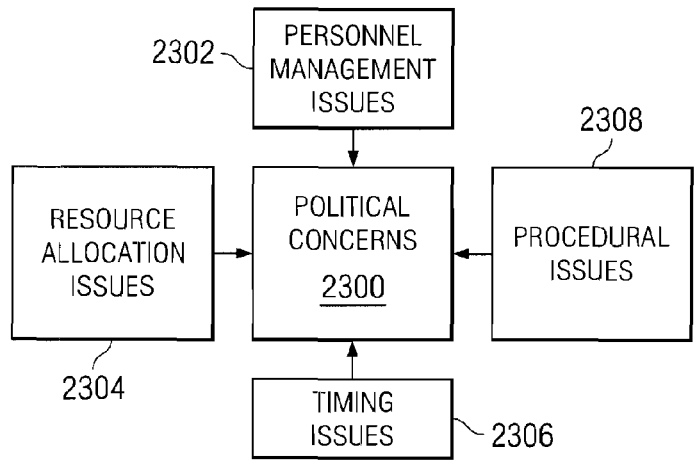
FIG. 23 is a block diagram illustrating exemplary political concerns, in accordance with an illustrative embodiment.

FIG. 23 is a block diagram illustrating exemplary political concerns, in accordance with an illustrative embodiment. FIG. 23 corresponds to political concerns 706 in FIG. 10. Political concerns 2300 shown in FIG. 23 can be described as data in a data processing system, such as data processing systems 104, 106, 110, 112, and 114 in FIG. 1 and data processing system 200 shown in FIG. 2. Political concerns 2300 described in FIG. 23 can be implemented among multiple computers over a network, such as network 102 shown in FIG. 1. Additionally, political concerns 2300 can be considered a type of boundary conditions provided as input into an optimization engine, such as optimization engine 704 in FIG. 7 and FIG. 10.

Political concerns 2300 represent the accumulation of all political concerns, as defined by the organization. Examples of project concerns include personnel management issues 2302, resource allocation issues 2304, timing issues 2306, and procedural issues 2308. Each exemplary political concern 2302 through 2308 is quantified as a number so that a corresponding political concern can be processed by an optimization engine.

Examples of personnel management issues 2302 include preventing certain types of employees from interacting with each other. For example, a large law firm might desire to avoid having certain employees interact with each other in order to maintain certain privacy issues. Examples of resource allocation issues 2304 include a desire by an organization to require that for every dollar received by organization A, organization B should also receive two dollars. An example of timing issues 2306 is a desire by an organization to produce deliverables in a particular order or within a particular time period. Examples of procedural issues 2308 include a desire by an organization to require that a particular individual within an organization receive a particular report before some other individual in the organization.

Figure 24:
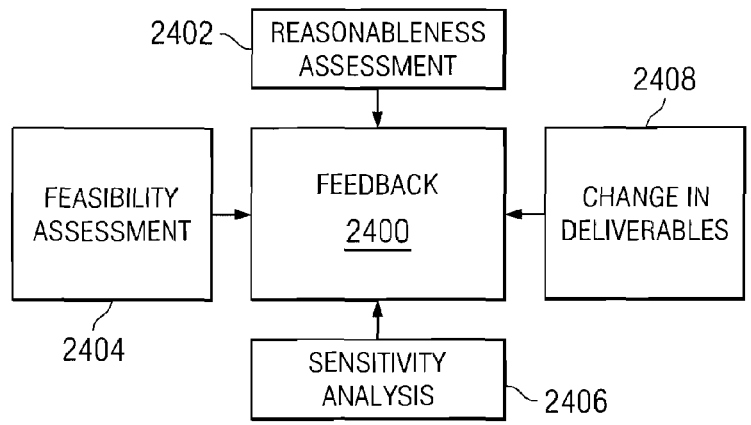
FIG. 24 is a block diagram illustrating examples of feedback applied to an optimization engine, in accordance with an illustrative embodiment.

FIG. 24 is a block diagram illustrating examples of feedback applied to an optimization engine, in accordance with an illustrative embodiment. FIG. 24 corresponds to feedback 708 in FIG. 10. Feedback 2400 shown in FIG. 24 can be described as data in a data processing system, such as data processing systems 104, 106, 110, 112, and 114 in FIG. 1 and data processing system 200 shown in FIG. 2. Feedback 2400 described in FIG. 24 can be implemented among multiple computers over a network, such as network 102 shown in FIG. 1.

Feedback 2400 includes changes made to the input provided to the optimization engine. Examples of feedback include a reasonableness assessment 2402, feasibility assessment 2404, sensitivity analysis 2406, and change in deliverables 2408. Each exemplary type of feedback 2402 through 2408 is quantified as a number so that the optimization engine can re-perform an optimization after receiving the corresponding feedback.

Examples of reasonableness assessment include an assessment by one or more individuals whether a particular result is desirable. A reasonableness assessment can result in one or more adjustments to one or more inputs to the optimization engine. Although a reasonableness assessment involves human input, a reasonableness assessment is either quantified or results in a quantified change to an input in an optimization engine. An example of a feasibility assessment 2404 includes an assessment by one or more individuals that a particular result is feasible. A feasibility assessment can result in one or more adjustments to one or more inputs to the optimization engine. Although a feasibility assessment involves human input, a feasibility assessment is either quantified or results in a quantified change to an input in an optimization engine.

An example of sensitivity analysis 2406 is to adjust slightly one or more inputs to the optimization engine and then to re-execute the optimization process. If the final result changes dramatically as a result of a slight adjustment, then the optimized solution, which is the optimized major information technology project, is considered fragile. Fragile solutions are undesirable because they are subject to a high degree of risk. Thus, one or more elements of the solution model might be adjusted in order to produce a stable solution that is not a fragile solution.

An example of a change in deliverables is a change in the desired output objects. For example, an organization might desire to produce more, fewer, or different output objects as the planning the major information technology project proceeds. Changes in these output objects change the inputs to the optimization engine.

FIG. 25 is a block diagram illustrating a computer-implemented method of creating optimized sub-projects for a major information technology project, in accordance with an illustrative embodiment. The method shown in FIG. 25 can be implemented in one or more data processing systems, such as data processing systems 104, 106, 110, 112, and 114 in FIG. 1 and data processing system 200 shown in FIG. 2. The method shown in FIG. 25 can be implemented among multiple computers over a network, such as network 102 shown in FIG. 1.

FIG. 25 summarizes the counter-intuitive method of selecting a set of optimized sub-projects into a plan for creating an optimal project definition. Instead of proceeding from a "right to left" perspective shown in the prior art method of FIG. 4, the illustrative embodiment shown in FIG. 25 solves the problem of planning a major information technology problem from "left to right."

In brief summary, input 2500 is fed into optimization engine 2502. Input 2500 includes solution model 702 shown in FIG. 7 and FIG. 10. Input 2500 also includes boundary conditions. Boundary conditions include resources 400 and constraints 402, shown in FIG. 4 and FIG. 10, as well as political concerns, shown in FIG. 7 and FIG. 10. Input 2500 also includes feedback 708, shown in FIG. 7 and FIG. 10. Input can also include other data, if desired.

A mathematical optimization operation is then performed on input 2500 during optimization 2502. As described above, optimization operations are known and have been implemented in available software. As a result of the optimization operation, optimized sub-projects 2504 are selected for major information (IT) project 2506.

FIG. 26 is a flowchart illustrating a computer-implemented method of creating optimized sub-projects for a major information technology project, in accordance with an illustrative embodiment. The method shown in FIG. 26 can be implemented in one or more data processing systems, such as data processing systems 104, 106, 110, 112, and 114 in FIG. 1 and data processing system 200 shown in FIG. 2. The method shown in FIG. 26 can be implemented among multiple computers over a network, such as network 102 shown in FIG. 1. The term "processor" as used in the description of FIG. 26 refers to one or more processors that are possibly connected via a network. The definitions of various terms used with respect to the description of FIG. 26, and the interactions of corresponding objects, can be found in the description of FIG. 7 through FIG. 24.

The process shown in FIG. 26 begins along two simultaneous paths. Along the first path, the processor receives input regarding output objects (step 2600). The processor then receives valuation data for output objects (step 2602).

From that point, simultaneously the processor both receives input regarding "as-is" data sources (step 2604) and also begins decomposing output objects. Specifically, the processor decomposes output objects into data objects (step 2606) and decomposes output objects into logical processes used to create the output objects (step 2610).

After decomposing output objects into data objects at step 2606, the processor organizes data objects into "to be" data structures. Simultaneously, the processor determines value clusters (step 2612) from the logical processes used to create the output objects at step 2610 and from the "to be" data structures at step 2608. The processor then creates an affinity matrix (step 2614) using the information gained form the value clusters determined in step 2612.

Returning to steps 2604 and 2608, the processor thereafter maps "to be" data structures organized in step 2608 to "as-is" data sources received in step 2604 (step 2616). The processor then determines processes for getting data from the source to the target (step 2618). Step 2618 is similar to transformation issues block 1018 in FIG. 10.

Returning to the start of the process, the processor also receives data regarding resources (step 2620), data regarding constraints (step 2622) and data regarding political concerns (step 2624). Steps 2620, 2622, and 2624 can be performed in parallel or in a different order shown in FIG. 26.

Next, the affinity matrix created in step 2614, the processes for getting data from the source to the target in step 2618, data regarding resources at step 2620, data regarding constraints at step 2622, and data regarding political concerns at step 2624 are provided as input into an optimization engine. The processor, using the optimization engine, then performs an optimization operation within the constraints provided (step 2626).

A determination is then made whether feedback is desired or required (step 2628). If feedback is desired or required, then the processor receives adjustments (step 2630). The process then returns to the start of the process and the entire process is repeated, though one or more steps of the process are modified or adjusted to take into account the feedback. However, if feedback is not desired or required, then the process terminates.

The output of the optimization engine can be stored in a storage device. The output of the optimization engine is the optimized project, having optimally selected optimized sub-projects. A storage device can be any storage suitable for storing data, such as but not limited to hard disk drives, random access memory, read only memory, tape drives, floppy disk drives, or any other data storage medium.

Thus, a computer-implemented method, computer program product, and data processing system are provided for creating optimized sub-projects for a project. Boundary conditions, input regarding output objects, and input regarding "as-is" data sources are received. The output objects are decomposed into data objects and the output objects are also decomposed into logical processes used to create the output objects. Value clusters are determined. The data objects are organized into "to be" data structures and the "to be" data structures are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

In another example, a computer-implemented method is provided for creating optimized sub-projects for a project. Boundary conditions, input regarding output objects, and input regarding "as-is" data sources are received. The output objects are decomposed into data objects and logical processes used to create the output objects. Value clusters are determined. The data objects are organized into "to be" data structures and the "to be" which are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the above information.

The illustrative embodiments also provide for a computer-implemented method, computer program product, and data processing system for creating a data warehousing scheme having optimally selected components. A mathematical model of a goal for the data warehousing scheme is input into an optimization engine. At least one constraint on the data warehousing scheme is input into the optimization engine. A mathematical optimization algorithm is performed using the optimization engine, wherein an output of the optimization engine is an optimized data warehousing scheme having optimally selected components. The optimized data warehousing scheme can be stored.

Figure 27:
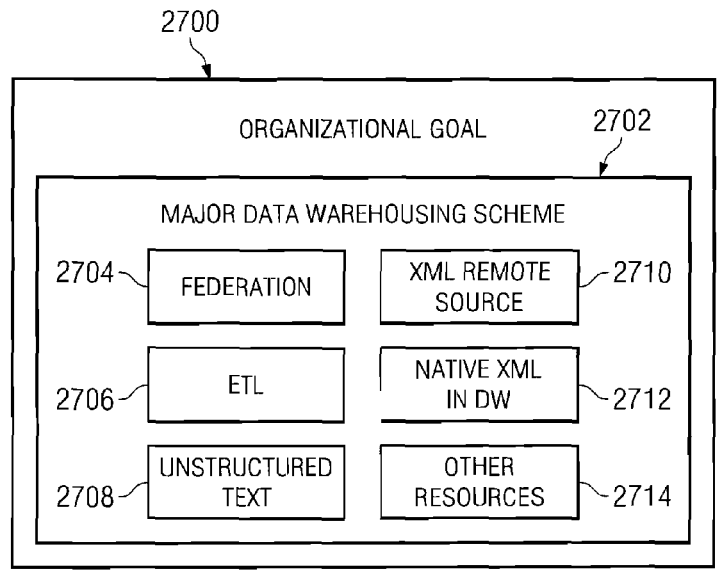
FIG. 27 is a block diagram of a of a major data warehousing scheme, in accordance with an illustrative embodiment.

FIG. 27 is a block diagram of a of a major data warehousing scheme, in accordance with an illustrative embodiment. An organization has organizational goal 2700, which is similar to or the same as organizational goal 300 in FIG. 3. Organizational goal 2700 is one or more goals that the organization desires to implement. The goal may be to create a hospital system, a new government agency, a new major corporation, or any other goal. In the illustrative embodiments described herein, organizational goal 2700 is a large scale goal similar to those described in the previous examples. One goal of the organization is to select a major data warehousing scheme that maximizes value to the organization while minimizing costs, while taking into account constraints determined by the organization.

As part of organizational goal 2700, major data warehousing scheme 2702 is to be implemented to create a large scale data warehousing scheme. A data warehousing scheme is a system of data processing systems, networking systems, software, data storage types, and data types used to maintain the data and operations of the organization. A data warehousing scheme is not necessarily located in one single physical location, but usually is situated in many different physical sites implemented using numerous physical devices and software components. A large scale data warehousing scheme can be referred to as a major data warehousing scheme 2702.

Major data warehousing scheme 2702 may be an additional output in major information technology project 302 shown in FIG. 3. For example, major data warehousing scheme 2702 can be considered to be in its own box inside major information technology project 302, in addition to the outputs referred-to by reference numerals 304, 306, 308, 310, 312, and 314. In this case, the outputs shown in major data warehousing scheme 2702 can be considered sub-outputs of major information technology project 302. However, major data warehousing scheme 2702 can be a stand alone project to be determined for a particular organization.

Major data warehousing scheme 2702 has as goals one or more specifications as to how data is to be stored and accessed, and one or more specifications regarding in what types of data that data should be stored. Output objects are those outputs or deliverables that the major data warehousing scheme 2702 is designed to deliver. Specific examples of output objects include federation 2704, ETL (Extract, Transform, and Load) 2706, unstructured text 2708, XML remote source 2710, native XML in DW (Data Warehouse) 2712 format, and other resources 2714. Each output represents a recommendation that a portion of the total overall data be stored in a certain manner or be stored as a particular data type.

Federation 2704 represents a recommendation that a portion of the total overall data be stored in the form of federated data. Federated data is data that is stored remotely from the location where data is used. Federated data can be generated on-site and then stored in one or more remote databases, which are themselves sometimes distributed among many different physical locations. Frequently, federated data is stored in multiple remote locations. Federated data is accessed via a network. Advantages of storing data in federated form include ease of access and relatively low cost of physically storing the data, especially in the case where some other organization maintains the data. Disadvantages of federated data include relatively slow response time and a higher requirement for relatively more or better physical hardware and for more or better networking resources.

ETL (Extract, Transform, and Load) 2706 represents a recommendation that a portion of the total overall data be stored in the form of data that has been ETL'd. ETL'd data is data that is stored at the same location at which the data is used. ETL'd data is referred to as "Extracted, Transformed, and Loaded" because such data is literally extracted from an external site, transformed into an appropriate data storage type, and loaded on a local data processing system. However, ETL'd data could also be data that is generated on-site and then stored on-site. Frequently, ETL'd data is accessed directly, such as on a hard drive, though ETL'd data could take the form of a tape storage library, a hard disk drive form, or many other forms. Advantages of storing data as ETL'd data include lower networking and hardware resources relative to federated data, as well as more rapid query response time relative to federated data. Disadvantages of ETL'd data include high design and implementation costs, and the need to maintain the physical storage facilities.

Unstructured text 2708 represents a recommendation that data be stored in a data type known as unstructured text. Unstructured text is text data that has little or no structure, such as paragraph returns, mark-ups, formatting codes, or other structuring commands. As a result, unstructured text is relatively easy to deal with, but is more difficult for a human to read and understand. Many important data sources exist in an unstructured form, such as pathology result text, police report text, journal articles, patents, and many others. Use of unstructured text is much more flexible than discrete forms of data. Unstructured text can be made available from structured text or other forms of data using specialized tools. For example, OmniFind by International Business Machines Corporation of Armok, N.Y., uses the Unstructured Information Management Architecture (UIMA). UIMA is an open, industrial-strength, scaleable and extensible platform for creating, integrating and deploying unstructured information management solutions from combinations of semantic analysis and search components. OmniFind uses the UIMA framework to parse and discritize text in a manner similar to human behavior. For example, text can be dropped into OmniFind, which then converts unstructured text into both discrete data in relational format and marked-up text in color for easier review by humans.

XML remote source 2710 represents a recommendation that data be stored in a remote source in XML format. XML stands for "eXstensible Markup Langauge." A markup language provides a way to combine text and information about the text. The extra information, including structure, layout, or other information, is expressed using the markup language, which is typically intermingled with the primary text. The best known markup language is HTML (Hypertext Markup Language), one of the foundations of the World Wide Web. However, common to all markup languages, including XML, is that markup languages are not computationally friendly to set level analytics or other similar tasks.

Nevertheless, some database management systems, such as DB2 V9 by International Business Machines Corporation of Armonk, N.Y., offer the ability to store XML formatted documents as a fully supported data type natively in the database. Such systems have the advantages of very low design and implementation costs. Such systems are also very powerful tools for formulating useful queries. However, such systems require a very high amount of processor power, require very high runtime data movement and conversion, and thus tend to have poor query response time.

Native XML in DW (Data Warehouse) 2712 format represents a recommendation that data be stored in XML format at a local source. Again, tools such as DB2 V9 can accomplish storing data in this markup language format. Like XML remote source 2710, native XML in DW (Data Warehouse) 2712 format has very low design and implementation costs and generates powerful queries. Native XML in DW (Data Warehouse) 2712 format has the additional advantage of eliminating runtime data movement and improved query responsiveness, though at the cost of a high requirement for on-site storage facilities for the data. On-site storage facilities include hardware, software, and personnel required to operate and maintain the hardware and software.

Although major data warehousing scheme 2702 is expressed as having output objects 2704, 2706, 2708, 2710, 2712, and 2714 comprising recommendations regarding data storage, many other types of output objects could also exist. For example, other types of output objects could be recommendations regarding applications to be used with data, database types and structures, data cubes, data structures, a recommendation that data be stored in flat files, a scheme plan, and a natural language representation of data. Other types of output objects exist.

FIG. 28 is a table showing relative costs and constraints of various methods of warehousing and accessing data, in accordance with an illustrative embodiment. Table 2800 represents two forms of data storage, ETL (Extract, Transform, and Load), and Federation. The table shown in FIG. 28 also represents two formats or data types in which data is stored, XML from remote source and Native XML in DW (Data Warehouse) format. These data storage methods and data types are described with respect to FIG. 27.

Column 2802 provides a non-limiting list of potential costs associated with the different forms of data storage and the different data types. Column 2804 provides a non-limiting list of corresponding values for storing data as ETL'd data. Column 2806 provides a non-limiting list of corresponding values for storing data as federated data. Column 2808 provides a non-limiting list of corresponding values for storing data in XML remote source format. Column 2810 provides a non-limiting list of corresponding values for storing data in native XML in DW (Data Warehouse) format. Column 2812 provides a non-limiting list of describing constraints associated with each type of cost.

For example, row 2814 shows that ETL'd data has a high design cost, that federated data has a medium design cost, that XML from remote source data formatting has a low design cost, and that native XML in DW (Data Warehouse) data formatting has a low design cost. The cell corresponding to the intersection of column 2812 and row 2814 shows that design costs include the requirement for at least one data modeler, data base administration, and data architects.

The values for the various cells in the remaining rows show that each form of data storage form and data type has different advantages and disadvantages and different types of constraints. Thus, with only two data storage forms and two data storage types, well over 50 factors should be weighed. The weighing of factors is additionally complicated by additional constraints, as indicated in rows 2816, 2818, and 2820. For example, as shown in row 2816, storing data as a markup language requires that the system output is only available as a markup language. Federated data, as shown in row 2818, may have databases that are restricted for legal or political reasons, or are restricted in how frequently the federated databases are updated. ETL'd data, as shown in row 2820, has limited runtime network capacity.

Even more significantly, table 2800 represents only a very small portion of the number of factors that should be considered when designing a major data warehousing scheme. When both the number of costs in column 2802 increases and the number of data storage forms and data storage types increases, the number of considerations and the complexity of the problem increases exponentially. In other words, if the rows and columns are doubled, the number of considerations quadruples—and the complexity of designing the data warehousing scheme increases by an even larger exponential factor. Even with the best of intentions, a warehousing scheme designed by unaided human intelligence is likely to be sub-optimal relative to the goals of the organization that the data warehousing scheme is to serve. However, when political considerations are added to complex data warehousing schemes, the result can be a disaster in which millions of dollars are wasted on a data warehousing scheme that, unbeknownst to the architects, was doomed to failure from the start.

Thus, a solution to the problem of designing complex data warehousing schemes is needed. Existing tools for building warehousing schemes are inaccurate because they rely on human input to determine the sub-projects or initial selections of a user. For example, set level analytics may be within a single application, data may remain un-unified, multiple silos may exist with finder files between them, and other issues prevent existing applications from solving the problem satisfactorily. In another example, data for set level analytics is at the point of having many new data types without an efficient method of integrating the overall decision or data warehousing scheme into an optimized whole.

Thus, what is needed is a solution that can be sold as a design service for the computer-assisted, mathematically optimized selection of sub-components of a data warehousing scheme. The sub-components are recommendations for storing portions of data in one or more forms of storage and in one or more types of data formats, possibly including duplication of certain portions of data in multiple data formats or data storage forms.

Figure 29:
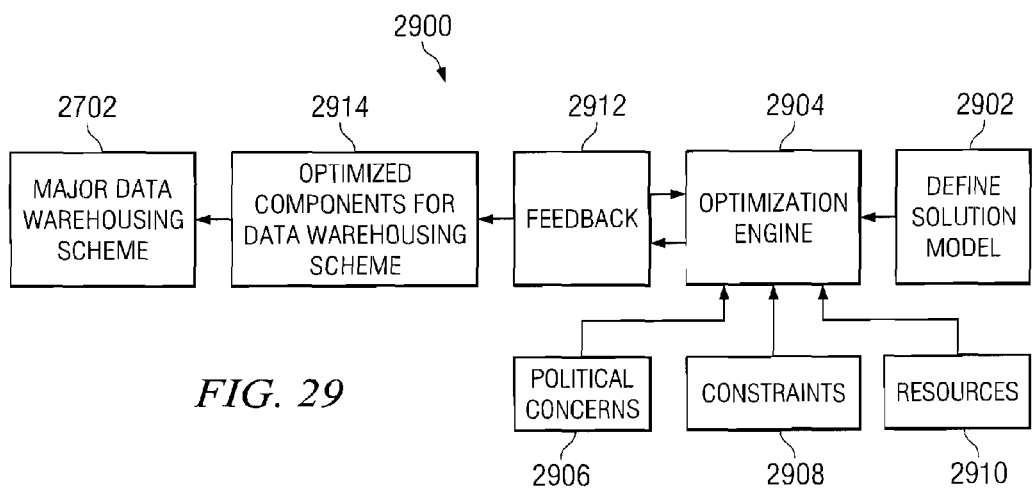
FIG. 29 is a block diagram illustrating a computer-implemented method of creating optimized sub-selections of data storage forms for a major data warehousing scheme, in accordance with an illustrative embodiment.

FIG. 29 is a block diagram illustrating a computer-implemented method of creating optimized sub-selections of data storage forms for a major data warehousing scheme, in accordance with an illustrative embodiment. The process shown in FIG. 29 is similar to the process shown in FIG. 7. The process shown in FIG. 29 shows that the problem of creating a major data warehousing scheme can be solved using mathematical optimization techniques.

Thus, the method shown in FIG. 29 can be implemented in one or more data processing systems, such as data processing systems 104, 106, 110, 112, and 114 in FIG. 1 and data processing system 200 shown in FIG. 2. The method shown in FIG. 29 can be implemented among multiple computers over a network, such as network 102 shown in FIG. 1.

FIG. 29 illustrates a counter-intuitive method 2900 of selecting a set of optimally selected components into a plan for creating an optimal project definition for a major data warehousing scheme. Instead of proceeding from a "right to left" perspective shown in FIG. 4, the illustrative embodiment shown in FIG. 29 solves the problem of planning a major data warehousing scheme from "left to right." Specifically, the term "left to right" in this context means that the illustrative process first defines a solution model 2902, instead of first defining the problem—as in FIG. 4.

Although this process is similar to the process shown in FIG. 7, the process shown in FIG. 29 can be either separate from, or an integral part of, defining an a major information technology project. For example, the optimally selected components of the major data warehousing scheme can be sub-projects of the major data warehousing scheme that is, itself, a sub-project of the major information technology project.

In the solution model 2902, the goals of the major data warehousing scheme are represented in a mathematical format. For example, one or more numerical values can be assigned to different aspects of a major data warehousing scheme in order to represent the goals of the major data warehousing scheme. This mathematically defined solution model is input into optimization engine 2904.

An optimization engine is a computer-implementable software application that performs rigorously defined mathematically optimization, as defined above, on inputs provided in solution model 2902. Additional inputs include mathematically defined values of available resources 2910, constraints 2908, and political concerns 2906. Although political concerns 2906 are actually a subset of constraints 2908 and/or resources 2910, they are specifically mentioned, as even qualitative assessments of political considerations can be given numerical values, thereby including the impact of political considerations when running the optimization algorithms.

Optimization engine 2904 then performs mathematical optimization algorithms on the submitted input. Sample optimization mathematics and algorithms are provided just prior to the description for FIG. 3. During this process, the objective function defined in terms of user utility across a large set of users with differing needs, wants, and desires, and other desirable factors is maximized. Simultaneously, the costs, development time, storage space, CPU usage, on-going maintenance costs, network traffic, query response times, complexity of writing queries, memory residence, disk delays, disk space, and other less desirable factors is minimized. The maximum/minimum analysis is performed subject to constraints, such as but not limited to available internal and external skills, security and privacy requirements, policy requirements, budget constraints, current infrastructure available, use case data requirements, maximum acceptable query times, and other possible constraints.

The goal of the mathematical optimization process is to maximize, objectively, the enterprise business information value in a repeatable format by recommending components for how to store various portions of data and recommending components for how to store the same or other various portions of data in one or more data types. The output optimally selected components of the major data warehousing scheme take into account all inputted goals, constraints, and resources.

Optionally, feedback 2912 is provided on the output. For example, upon review, a new constraint may be considered or revealed, such as, for example, a new political, physical, or software constraint. New resources may also present themselves. These additional inputs, together with the previous set of optimized components, are input back into optimization engine 2904. A new output of optimally selected components for the major data warehousing scheme is then provided.

After feedback 2912, the output of optimization engine 2904 is a set of optimized components for a data warehousing scheme 2914. The term "optimally selected components" means that the components were selected via a mathematical optimization project. Together, the set of optimally selected components forms major data warehousing scheme 2702.

The process, usually proceeds through several adjustments and iterations in order to bring the major data warehousing scheme into closer agreement with expectations of those responsible for the major data warehousing scheme. Thus, feedback process 2908 allows a user or process to adjust one or more of solution model 2902, resources 2910, constraints 2908, or political concerns 2906 and then re-execute optimization engine 2904. Ultimately, the result of the process shown in FIG. 29 is an optimized major data warehousing scheme 2702 having optimally selected components 2914 that are in accord with expectations of those responsible for the major data warehousing scheme.

Figure 30:
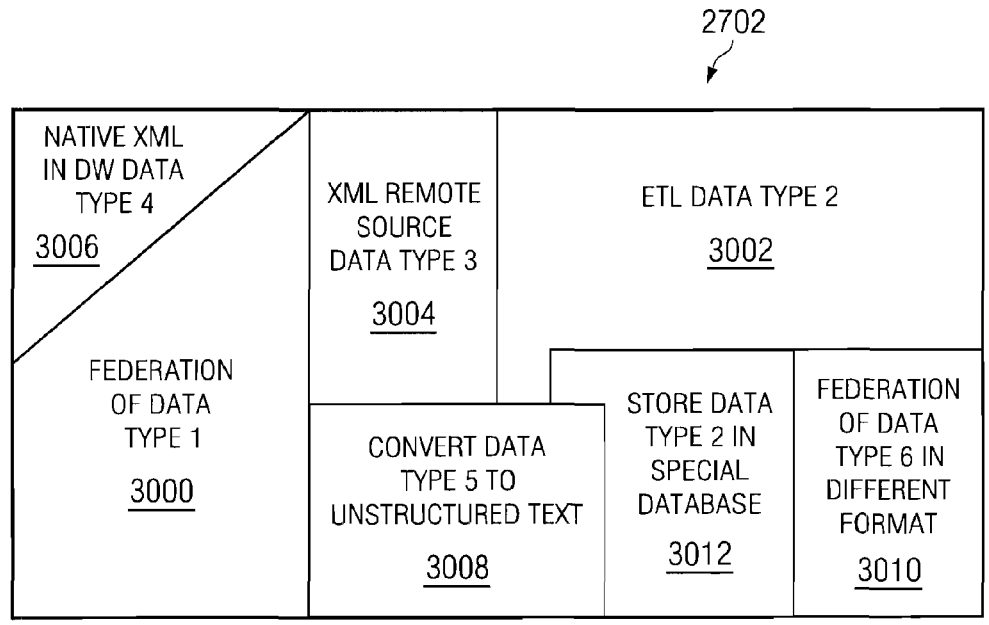
FIG. 30 is a block diagram illustrating optimally selected sub-components of data storage forms for a major data warehousing scheme, in accordance with an illustrative embodiment.
Figure 31:
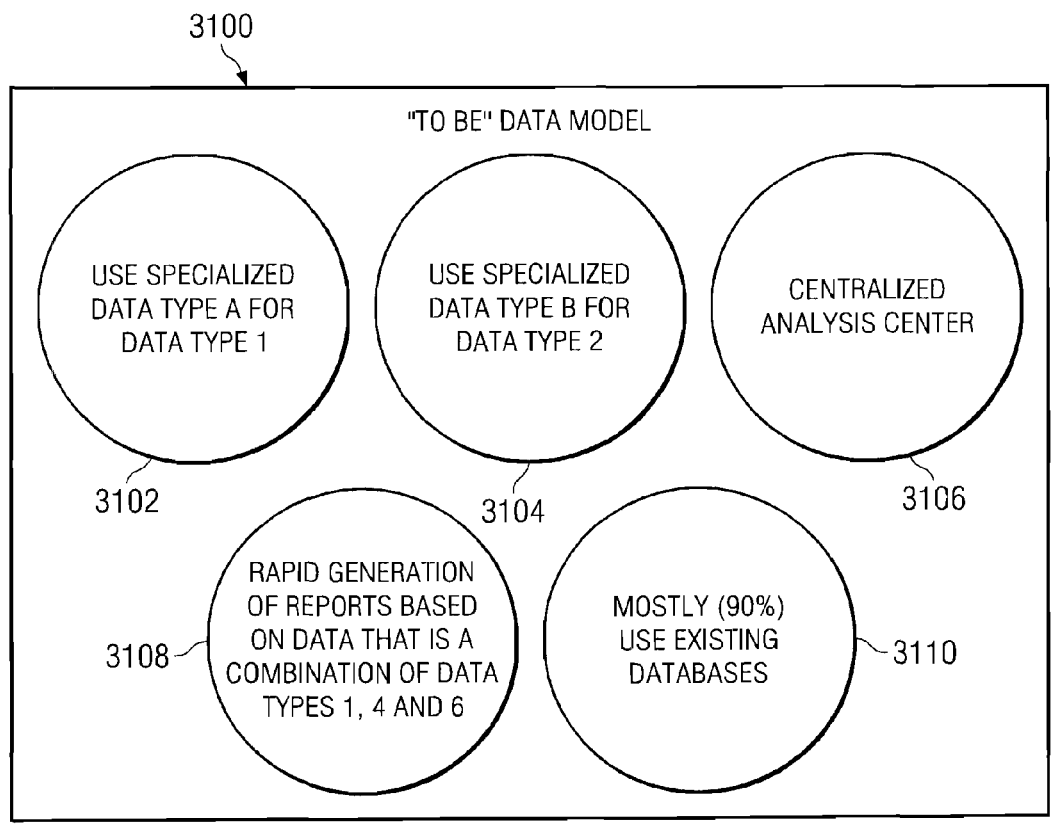
FIG. 31 is a block diagram illustrating a "to be" data model for a major data warehousing scheme, in accordance with an illustrative embodiment.

The process shown in FIG. 29 is data centric. In other words, the process shown in FIG. 29 is based on data and mathematical characterizations of factors important to the major data warehousing scheme. As a result, as shown in FIG. 30 and FIG. 31, the optimally selected components 2914 more closely reflect underlying realities of "as-is" conceptual objects. Thus, by using the method shown in FIG. 29, the probability of success of completing an efficient major data warehousing scheme is greatly increased.

FIG. 30 is a block diagram illustrating optimally selected sub-components of data storage forms for a major data warehousing scheme, in accordance with an illustrative embodiment. The optimally selected sub-components shown in FIG. 30 are part of major data warehousing scheme 2702. The relative sizes and shapes of the boxes shown in FIG. 30 are abstract representations of how, where, in what proportion relative to the total overall data, and in what data type that a particular portion of data is to be stored.

In the illustrative example of FIG. 30, seven data types or methods of data storage are presented. For example, optimally selected component 3000 is a recommendation that data type 1 be federated. In contrast, optimally selected component 3002 is a recommendation that data type 2 be ETL'd data. Additionally, optimally selected component 3004 recommends that data type 3 should be stored as XML data and be stored remotely. Optimally selected component 3006 recommends that data type 4 be stored natively (locally) in XML in DW (Data Warehouse) format. Optimally selected component 3008 recommends that data type 5 be converted to and stored as unstructured text. Note that this recommendation may lead to feedback and re-selection of optimized components, taking as additional input the resources needed to convert data type 5 into unstructured text format.

Additionally, optimally selected component 3010 recommends that data type 6 be federated in a different format than the currently available format of data type 6. Again, this recommendation may lead to feedback and re-selection of optimized components, taking as additional input the resources needed to convert data type 6 into the desired format.

Additionally, optimally selected component 3012 recommends that data type 2 be stored in a special database having certain custom properties. Note that optimally selected component 3002 already recommends that data type 2 be ETL'd data. Thus, major data warehousing scheme 2702 can provide multiple recommendations for any given portion of data. Again, this recommendation may lead to feedback and re-selection of optimized components, taking as additional input the resources needed to create and maintain the special database.

By implementing optimally selected sub-components 3000 through 3012 in a particular order, which could be parallel implementation in some instances, the probability of successfully implementing major data warehousing scheme 2702 may be substantially increased. This order can be specified as a component in the overall specification of optimally selected components for the major data warehousing scheme.

In addition to the optimally selected components described above, and the order in which they should be implemented, many other optimally selected components can be generated. Other considerations can be added. The process of feedback can be used to adjust and tune major data warehousing scheme 2702. This iterative process continues until a user is satisfied at a result, or until desired changes to inputs result in only minor adjustments to the optimally selected components major data warehousing scheme 2702. This type of solution is known as a stable, or non-brittle solution.

FIG. 31 is a block diagram illustrating a "to be" data model for a major data warehousing scheme, in accordance with an illustrative embodiment. The processes described with respect to FIG. 10 through FIG. 20 can be used with respect to the generation of optimally selected components of major data warehousing scheme 2702. The process described with respect to FIG. 10 through FIG. 20 can also be used with respect to the generation of a major information technology project, of which the major data warehousing scheme is a sub-project. FIG. 31 shows an exemplary, non-limiting "to be" data model that can be used with respect to the process described in FIG. 10 through FIG. 20.

As described above, data objects are organized into "to be" data structures to form a "to be" data model, and the "to be" data structures are mapped to the "as-is" data sources. The phrase "to be", as used herein, describes something that is desired for the major data warehousing scheme that may, or may not, yet exist. The phrase "to be" also can be referred to as "future" or "future model." Thus, a "to be" data model is a model or other description of a future data model. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed, or a rough "concept sketch," in quantitative form, that reflects how data is to be stored or in what format data is to be stored. Although not all information regarding the future database is available, the "to be" model of the database describes the structure of the database and what information it should contain.

Continuing with the illustrative example, the "to be" data structures are mapped to the "as-is" data sources. An "as-is" data source is an existing source of data. The existing source of data may not be complete, may not be of sufficient quality, and may not be in a format desired for the completed major data warehousing scheme; nevertheless, the "as-is" data sources may be adequate for the completed major data warehousing scheme.

In the illustrative example shown in FIG. 31, "to be" data model 3100 includes requirement 3102 to use specialized data type A for data type 1. For example, requirement 3102 could be to use unstructured text for all files stored in the format of a particular word processing application. "To be" data model 3100 also includes requirement 3104 to use specialized data type B for data type 2. For example, requirement 3104 could be to use data stored in a markup language for all "To be" data model 3100 also includes requirement 3106 for a centralized analysis center. In other words, a single or closely grouped set of physical offices will be used to implement the enterprise. This fact would likely favor the use of federated data, though under the right conditions might militate in favor of ETL'd data.

"To be" data model 3100 also includes requirement 3108 for rapid generation of reports based on data that is a combination of data types 1, 4, and 6. The speed of generation of reports is likely to militate in favor of rapid query response time, and hence will increase the likelihood that a recommendation will be output that data types 1, 4, and 6 should be stored in a way and in a format that that favors query response time.

"To be" data model 3100 also includes requirement 3110 that of all databases to be maintained, most (90%) of the databases must be existing databases. This requirement increases the likelihood that a major data warehousing scheme will include software and/or hardware for converting existing data formats into desired formats. This requirement could increase the likelihood that one of federated data or ETL'd data be used, depending on the location of the existing databases and the availability and capability of available networking resources.

Thus, "to be" data model 3100 provides a model of a desired major data warehousing scheme. "To be" data model 3100 need not be a complete model, in the sense that "to be" data model 3100 describes all aspects of each of the sub components of the major data warehousing scheme. Instead, "to be" data model 3100 can be used in conjunction with an optimization engine and various additional constraints and resources to determine, using mathematical optimization algorithms, optimized components for a major data warehousing scheme. The resulting major data warehousing scheme will be much more likely to be both more efficient and robust.

Figure 32:
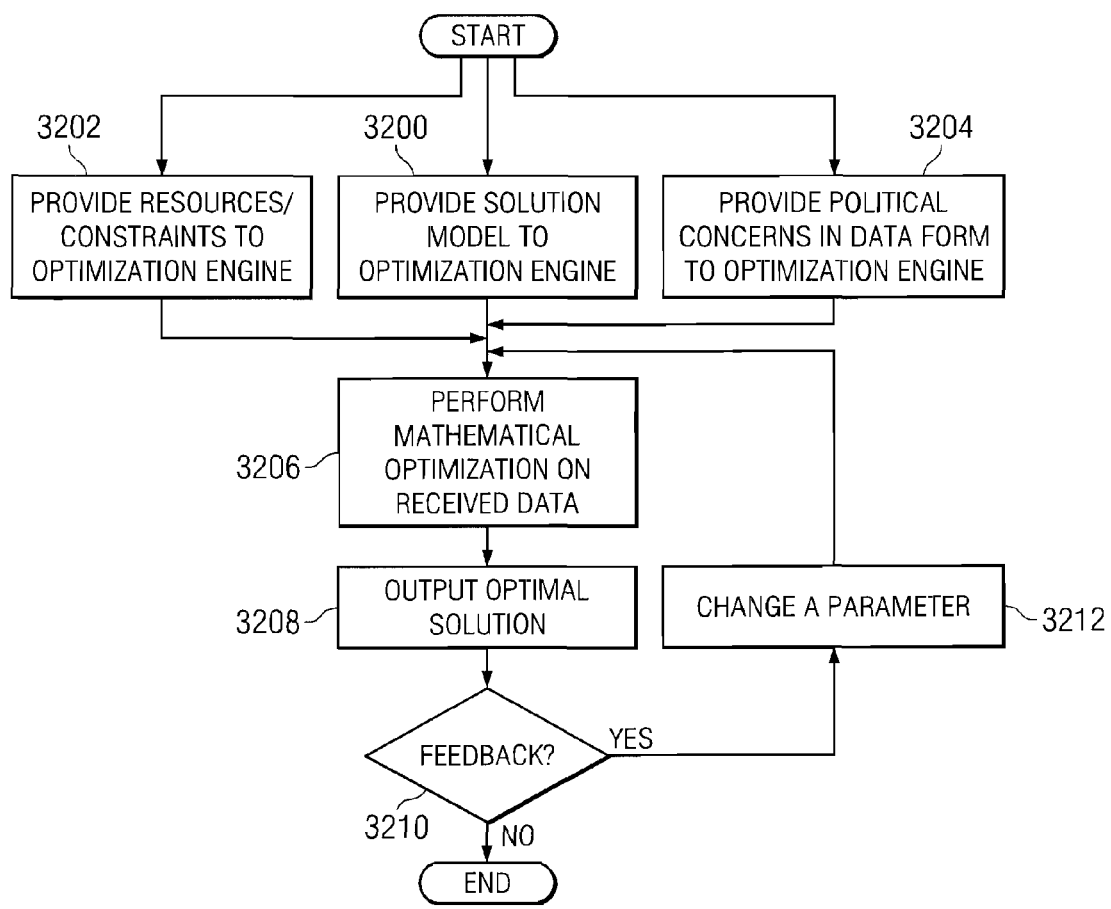
FIG. 32 is a flowchart illustrating a method of generating optimally selected sub components for a major data warehousing scheme, in accordance with an illustrative embodiment.

FIG. 32 is a flowchart illustrating a method of generating optimally selected sub components for a major data warehousing scheme, in accordance with an illustrative embodiment. The method shown in FIG. 32 can be implemented in one or more data processing systems, such as data processing systems 104, 106, 110, 112, and 114 in FIG. 1 and data processing system 200 shown in FIG. 2. The method shown in FIG. 32 can be implemented among multiple computers over a network, such as network 102 shown in FIG. 1. The term "processor" as used in the description of FIG. 32 refers to one or more processors that are possibly connected via a network. The definitions of various terms used with respect to the description of FIG. 32, and the interactions of corresponding objects, can be found in the description of FIG. 7 through FIG. 31.

The process begins along multiple, possibly simultaneous paths. A solution model is provided to an optimization engine (step 3200). A solution model could be "to be" data model 3100 of FIG. 31. The optimization engine is software and/or hardware that can receive input and process the input using mathematical optimization algorithms. The solution model can be characterized as a goal of an organization. Thus, the goal can be a quantitative assessment of desires of an organization for the data warehousing scheme. The goal can also be a quantitative assessment of enterprise requirements and of user needs.

The goal can be quantified in many different categories. Non limiting examples include "must have" results, or requirements. Examples of requirements can include auditing, governmental reporting, accreditation, financial reporting, or reports having close to 100% accuracy due to the fact that life or death consequences ride on the outcome of a report. Another example of a category can be use cases. Use cases can include desire for revenue increases, cost avoidance, customer relationship value maximization, customer retention, efficient use of assets and investments, employee satisfaction, and others. Categories can also include data storage forms, such as federated data or ETL'd data. Categories can also include data types, such as unstructured text or markup language. Note that data storage can be a hybrid between ETL'd data, federated data, and markup language designs.

Additionally, constraints and/or resources are provided to the optimization engine (step 3202). Constraints and/or resources are expressed quantitatively in the form of numbers or sets of numbers in matrices or databases. An example of a constraint input into an optimization engine is a mathematical characterization of political considerations relating to the data warehousing scheme. Thus, for example, a step in the process can be to provide political concerns in data form to the optimization engine (step 3204).

Non-limiting examples of political constraints that can be characterized quantitatively include a requirement that a first user receive a first output of a first query, a requirement that a data type be avoided for a first portion of data, a requirement that a data storage method be avoided for a second portion of data, a requirement that a data type be used for a third portion of data, a requirement that a data storage method be used for a fourth portion of data, a requirement that a software product from a particular company be used relative to a fifth portion of data, a requirement that a sixth portion of data be restricted from a set of users, a requirement that a seventh portion of data and an eight portion of data be isolated from each other, a requirement that a physical site be used when implementing the data warehousing scheme, a quantitative estimation of an impact that a data warehousing scheme plan may require approval of an organization before implementation, and combinations thereof.

Other constraints and/or resources can also be mathematically characterized and then input into the optimization engine. Non-limiting examples of constraints and/or resources can be a mathematical characterization of at least one of: political constraints, available funds, available hardware resources, available networking resources, available skills, development time allotted to developing the data warehousing scheme, expected network traffic, available storage space, expected usage of one or more processors, expected maintenance, minimum query response time, maximum query response time, expected query response time, complexity of query writing, memory residence, disk delays, requirement to outsource desired skills, an expected average skill level of average users of the data warehousing scheme, a skill level of a user of a specific portion of the data warehousing scheme, a requirement that an output of a query be in a particular format, a type of query, a user's ability to change a type of data that is to be output in response to a query, and combinations thereof.

Costs should be minimized. Costs include classic costs, such as money, hardware, network band with, processing power, storage space, software, licenses, services, design and architecture, programming, on-going maintenance costs, analytical opportunity costs, and others. Costs also can include hidden costs, such as opportunity costs, offsets to other desirable projects. Costs can also include the cost of obtaining specialized skills. Certain costs are sets of pluggable functions. For example, costs of hardware, software, and services may be treated as pluggable catalog entries. Similarly, inventories of available materials, or slack resources may have a real cost or opportunity cost associated with maintaining the inventory.

Constraints constrain the solution space of the major data warehousing scheme having optimally selected sub components. Constraints can include legal requirements, such as HIPPA (Health Insurance Portability and Accountability Act) requirements, fair credit reporting requirements, international, national, and local privacy laws, and others. In addition to the above, political constraints can include that project "1" must come before project "2" for funding reasons, or that "X" data must be available in "Y" form, or no project can occur. Constraints can also refer to specialized data requirements, such as "A" data and "B" data are only useful together in compatible schemas, or such as a requirement that certain data must be latest possibly updated data regardless of cost. Constraints can also refer to limited special resources, including availability and cost. Limited special resources can include specialized data modelers, specialists in UIMA (Unstructured Information Management Architecture), and/or users able to interpret specialized data.

Returning now to FIG. 32, after receiving various inputs in one or more of steps 3200, 3202, and 3204, the processor performs a mathematical optimization on the received data (step 3206). The mathematical optimization can be performing an optimization algorithm on the received data. Examples of optimization algorithms are described with respect to the paragraphs preceding the description of FIG. 3.

The processor then outputs an optimal solution (step 3208). The optimal solution is an optimized major data warehousing scheme having optimally selected sub components. The processor then determines whether feedback is to be received (step 3210). If feedback is to be received, then a change in a parameter is received in the optimization engine (step 3212). Non limiting examples of changes to parameters include addition, subtraction, or modification of one or more of constraints, resources, or goals. The process then returns to step 3206. However, if feedback is not received at step 3210, then the process terminates.

Figure 33:
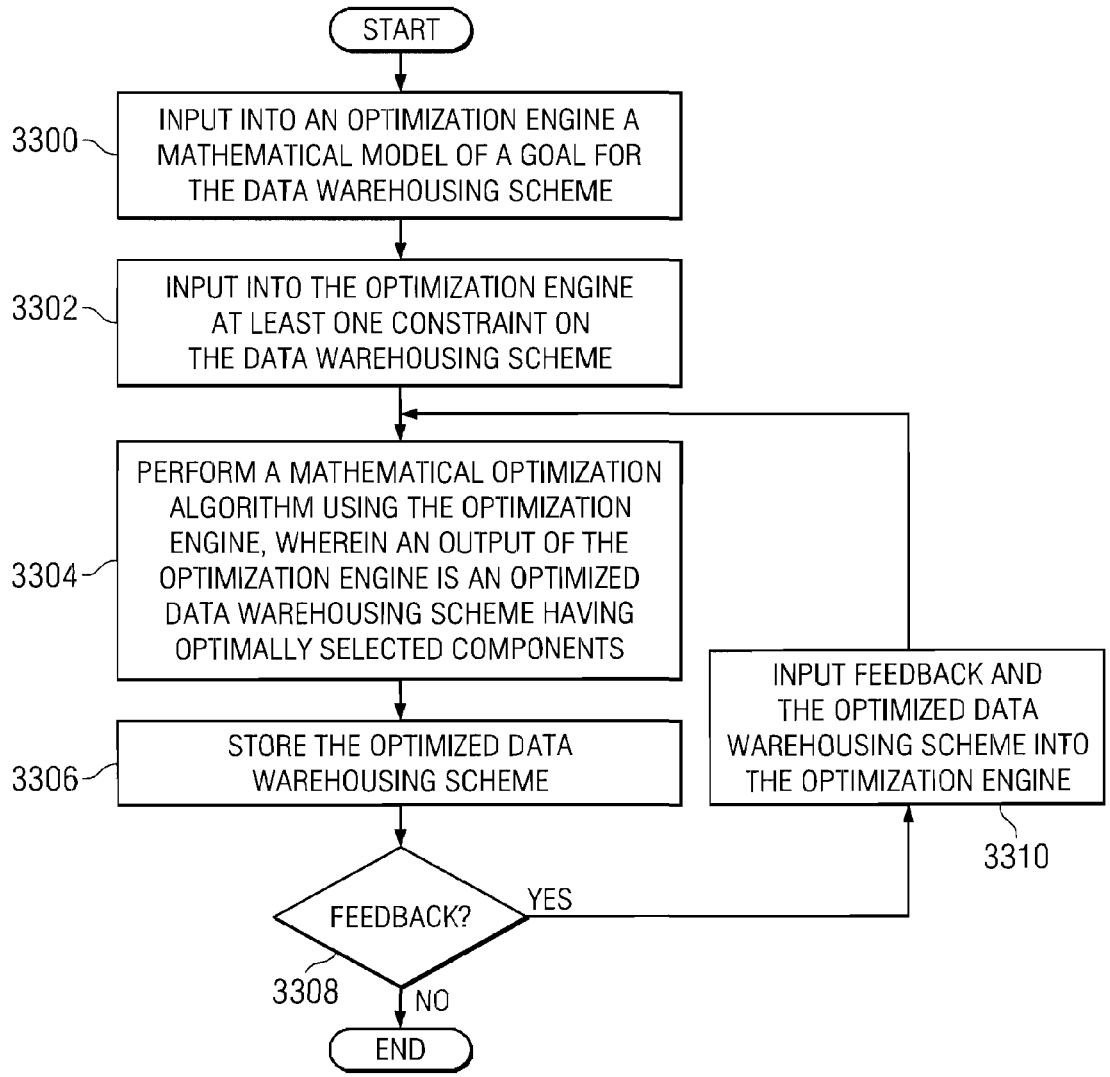
FIG. 33 is a flowchart illustrating a method of generating optimally selected sub components for a major data warehousing scheme, in accordance with an illustrative embodiment.

FIG. 33 is a flowchart illustrating a method of generating optimally selected sub components for a major data warehousing scheme, in accordance with an illustrative embodiment. The method shown in FIG. 33 can be implemented in one or more data processing systems, such as data processing systems 104, 106, 110, 112, and 114 in FIG. 1 and data processing system 200 shown in FIG. 2. The method shown in FIG. 33 can be implemented among multiple computers over a network, such as network 102 shown in FIG. 1. The term "processor" as used in the description of FIG. 33 refers to one or more processors that are possibly connected via a network. The definitions of various terms used with respect to the description of FIG. 33, and the interactions of corresponding objects, can be found in the description of FIG. 7 through FIG. 32.

The process begins as an optimization engine receives input of a mathematical model of a goal for a data warehousing scheme (step 3300). The optimization engine also receives at least one constraint on the data warehousing scheme (step 3302).

A processor, using the optimization engine, then executes a mathematical optimization algorithm using (step 3304). The output of the optimization engine is an optimized data warehousing scheme having optimally selected components. Optionally, the optimized data warehousing scheme is stored (step 3306).

A determination is then made as to whether the processor receives feedback (step 3308). If feedback is received, then the feedback and the optimized data warehousing scheme are both input into the optimization engine (step 3310). The process then returns to step 3304 and repeats. However, if no feedback is received at step 3308, then the process terminates.

The embodiments described herein have several advantages over known methods for planning various types of projects, such as major information technology projects. For example, the embodiments described herein provide data centric solution models that result in deterministically optimized projects having optimally selected optimized subprojects. Thus, the probability that a project planned with the embodiments described herein will succeed is much higher than projects planned with known methods. Additionally, projects planned according to the embodiments described herein are very likely to result in a final project that operates much more efficient than a final project planned with known methods.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for creating a data warehousing scheme having optimally selected components, the computer-implemented method comprising:

inputting into an optimization engine a mathematical model of a goal for the data warehousing scheme, wherein the data warehousing scheme is a system of data processing systems, networking systems, software, data storage types, and data types used to maintain data and operations of an organization;

inputting into the optimization engine at least one constraint on the data warehousing scheme and an affinity matrix, wherein the affinity matrix indicates relationships between groups of data sources and groups of output objects, and relationships between groups of available logical processes and groups of output objects, wherein each relationship is represented by a cell containing a binary value in which a zero indicates that a data source is not needed or is incomplete for a particular output object data structure and a one indicates that the data source exists and is used for the particular output object data structure and wherein upon completion of a major information technology project associated with the affinity matrix, every cell of the affinity matrix has a one;

performing a mathematical optimization algorithm using the optimization engine, the at least one constraint, and the affinity matrix, wherein an output of the optimization engine is an optimized data warehousing scheme having the optimally selected components in a specified order; and storing the optimized data warehousing scheme.

2. The computer-implemented method of claim 1 further comprising:

after performing the mathematical optimization algorithm, inputting feedback and the optimized data warehousing scheme into the optimization engine; and performing a second mathematical optimization algorithm using the optimization engine to generate a second output, wherein the second output comprises a second optimized data warehousing scheme having second optimally selected components; and storing the second optimized data warehousing scheme.

3. The computer-implemented method of claim 1 wherein the goal comprises a quantitative assessment of desires of an organization for the data warehousing scheme.

4. The computer-implemented method of claim 1 wherein the optimally selected components comprise a quantitative report on how data is to be stored and in what format the data is to be stored.

5. The computer-implemented method of claim 4 wherein the quantitative report comprises at least one recommendation regarding which portions of data should be federation, ETL'd (Extract, Transform, and Loaded), be stored in at least one type of database, and combinations thereof.

6. The computer-implemented method of claim 4 wherein the quantitative report comprises at least one recommendation regarding which portions of data should be stored in a format selected from at least one of: unstructured text, a markup language, a genomic array, image data, multi-media data, and combinations thereof.

7. The computer-implemented method of claim 4 wherein the quantitative report comprises a recommendation that at least a portion of all available data be stored as a combination of unstructured text format and markup language format, and wherein the quantitative report specifies relative proportions of unstructured text format to markup language format.

8. The computer-implemented method of claim 4 wherein the quantitative report comprises a recommendation that at least a specific portion of all available data be stored in unstructured text format, wherein the specific portion is not currently stored as unstructured text, and wherein the report further comprises a recommendation that a first application be used for converting the specific portion to unstructured text.

9. The computer-implemented method of claim 1 wherein the at least one constraint comprises a mathematical characterization of political considerations relating to the data warehousing scheme.

10. The computer-implemented method of claim 9 wherein the political considerations comprise at least one of:

a requirement that a first user receive a first output of a first query, a requirement that a data type be avoided for a first portion of data, a requirement that a data storage method be avoided for a second portion of data, a requirement that a data type be used for a third portion of data, a requirement that a data storage method be used for a fourth portion of data, a requirement that a software product from a particular company be used relative to a fifth portion of data, a requirement that a sixth portion of data be restricted from a set of users, a requirement that a seventh portion of data and an eight portion of data be isolated from each other, a requirement that a physical site be used when implementing the data warehousing scheme, a quantitative estimation of an impact that a data warehousing scheme plan may require approval of an organization before implementation, and combinations thereof.

11. The computer-implemented method of claim 1 wherein the at least one constraint comprises a mathematical characterization of at least one of:

political constraints, available funds, available hardware resources, available networking resources, available skills, development time allotted to developing the data warehousing scheme, expected network traffic, available storage space, expected usage of one or more processors, expected maintenance, minimum query response time, maximum query response time, expected query response time, complexity of query writing, memory residence, disk delays, requirement to outsource desired skills, an expected average skill level of average users of the data warehousing scheme, a skill level of a user of a specific portion of the data warehousing scheme, a requirement that an output of a query be in a particular format, a type of query, a user's ability to change a type of data that is to be output in response to a query, and combinations thereof.

12. The computer-implemented method of claim 1 wherein the data warehousing scheme is part of a major information technology project, and wherein the optimally selected components comprise a subset of optimally selected sub-projects of the major information technology project.

13. The computer-implemented method of claim 12 further comprising creating an optimized project having the optimally selected sub-projects, wherein creating the optimized project comprises:

determining value clusters, wherein each value cluster is a discrete intersection of selected data and an ability of the selected data to add value to an organization;

organizing data objects into data models of future data structures;

mapping the data models of future data structures to existing data sources;

determining additional processes, wherein the additional processes move the selected data from a source to a target;

creating the affinity matrix based on the value clusters;

inputting into an optimization engine boundary conditions, the existing data sources, the data objects, logical processes used to create output objects, the value clusters, the data models of future data structures, the mapping of the data models of future data structures to the existing data sources, the additional processes for moving data from the source to the target, formats of data to be used in the optimized project; and storing the optimized project in a storage device, wherein the optimized project is derived from an optimization process using the optimization engine.

14. The computer-implemented method of claim 13 wherein the output objects comprise one of screens, reports, queries, applications, deliverables, an interactive graphical user interface, and combinations thereof.

15. A computer program product comprising:

a non-transitory computer storage device having computer usable program code stored thereon for creating a data warehousing scheme having optimally selected components, the computer usable program code including:

computer usable program code for inputting into an optimization engine a mathematical model of a goal for the data warehousing scheme, wherein the data warehousing scheme is a system of data processing systems, networking systems, software, data storage types, and data types used to maintain data and operations of an organization;

computer usable program code for inputting into the optimization engine at least one constraint on the data warehousing scheme and an affinity matrix, wherein the affinity matrix indicates relationships between groups of data sources and groups of output objects, and between groups of available logical processes and groups of output objects, wherein each relationship is a cell containing a binary value in which a zero indicates that a data source is not needed or is incomplete for a particular output object data structure and a one indicates that the data source exists and is used for the particular output object data structure and wherein upon completion of a major information technology project associated with the affinity matrix, every cell of the affinity matrix has a one;

computer usable program code for performing a mathematical optimization algorithm using the optimization engine, the constraint, and the affinity matrix, wherein an output of the optimization engine is an optimized data warehousing scheme having the optimally selected components in a specified order; and computer usable program code for storing the optimized data warehousing scheme.

16. The computer program product of claim 15 wherein the goal comprises a quantitative assessment of desires of an organization for the data warehousing scheme.

17. The computer program product of claim 15 wherein the components comprise a quantitative report on how data is to be stored and in what format the data is to be stored.

18. A data processing system comprising:
a bus;
at least one processor coupled to the bus;
a computer usable medium coupled to the bus, wherein the computer usable medium contains a set of instructions for creating a data warehousing scheme having optimally selected components, wherein the at least one processor is adapted to carry out the set of instructions to:
input into an optimization engine a mathematical model of a goal for the data warehousing scheme, wherein the data warehousing scheme is a system of data processing systems, networking systems, software, data storage types, and data types used to maintain data and operations of an organization;
input into the optimization engine at least one constraint on the data warehousing scheme and an affinity matrix indicating relationships between groups of data sources and groups of output objects, and between groups of available logical processes and groups of output objects, wherein each relationship is a cell containing a binary value in which a zero indicates that a data source is not needed or is incomplete for a particular output object data structure and a one indicates that the data source exists and is used for the particular output object data structure and wherein upon completion of a major information technology project associated with the affinity matrix, every cell of the affinity matrix has a one;
perform a mathematical optimization algorithm using the optimization engine, the constraint, and the affinity matrix, wherein an output of the optimization engine is an optimized data warehousing scheme having the optimally selected components in a specified order; and
store the optimized data warehousing scheme.

19. The data processing system of claim 18 wherein the goal comprises a quantitative assessment of desires of an organization for the data warehousing scheme.

20. The data processing system of claim 18 wherein the components comprise a quantitative report on how data is to be stored and in what format the data is to be stored.

* * * * *